US011912579B2

(12) United States Patent
Evans et al.

(10) Patent No.: US 11,912,579 B2
(45) Date of Patent: Feb. 27, 2024

(54) AEROGEL COMPOSITIONS AND METHODS

(71) Applicant: Aspen Aerogels, Inc., Northborough, MA (US)

(72) Inventors: Owen Richard Evans, Chelmsford, MA (US); David J Mihalcik, Northborough, MA (US); Kathryn Elizabeth DeKrafft, Marlborough, MA (US); Wenting Dong, Marlborough, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 157 days.

(21) Appl. No.: 17/223,043

(22) Filed: Apr. 6, 2021

(65) Prior Publication Data

US 2021/0309527 A1 Oct. 7, 2021

Related U.S. Application Data

(60) Provisional application No. 63/006,003, filed on Apr. 6, 2020.

(51) Int. Cl.
*C01B 33/158* (2006.01)
*B01J 13/00* (2006.01)
*C01B 33/141* (2006.01)
*C01B 33/159* (2006.01)

(52) U.S. Cl.
CPC ....... *C01B 33/1585* (2013.01); *B01J 13/0091* (2013.01); *C01B 33/1412* (2013.01); *C01B 33/159* (2013.01); *C01P 2006/37* (2013.01)

(58) Field of Classification Search
CPC .............. B01J 13/0091; C01B 33/1585; C01B 33/1412; C01B 33/159; C01P 2006/37
See application file for complete search history.

(56) References Cited

U.S. PATENT DOCUMENTS

| | | | |
|---|---|---|---|
| 3,597,248 A | * | 8/1971 | Yates ................. C04B 35/6316 501/12 |
| 4,454,248 A | | 6/1984 | Pollock et al. |
| 4,610,863 A | | 9/1986 | Tewari et al. |

(Continued)

FOREIGN PATENT DOCUMENTS

| | | |
|---|---|---|
| WO | 01/094436 A2 | 12/2001 |
| WO | 2016/054524 A2 | 4/2016 |
| WO | 2019/232087 A1 | 12/2019 |

OTHER PUBLICATIONS

Jeon et al. J. Electrochem.Soc. 1995, 142, 621 (Year: 1995).*

*Primary Examiner* — Anthony J Zimmer
*Assistant Examiner* — Jordan W Taylor
(74) *Attorney, Agent, or Firm* — WOMBLE BOND DICKINSON (US) LLP; Deborah M. Vernon; Scott R. Breining

(57) ABSTRACT

The present disclosure provides an aerogel composition which is intrinsically hydrophobic without surface modification by a hydrophobizing agent, is durable and easy to handle, which has favorable performance in aqueous environments, and which also has favorable combustion and self-heating properties. Also provided is a method of preparing an aerogel composition which is intrinsically hydrophobic without surface modification by a hydrophobizing agent, is durable and easy to handle, which has favorable performance in aqueous environments, and which has favorable combustion and self-heating properties.

7 Claims, 1 Drawing Sheet

(56) References Cited

U.S. PATENT DOCUMENTS

| | | | |
|---|---|---|---|
| 4,666,948 A | | 5/1987 | Woerner et al. |
| 5,229,429 A | | 7/1993 | Hahn et al. |
| 5,240,488 A | * | 8/1993 | Chandross ........ C03B 37/01211 65/435 |
| 5,275,796 A | | 1/1994 | Tillotson et al. |
| 5,395,805 A | | 3/1995 | Droege et al. |
| 5,420,168 A | | 5/1995 | Mayer et al. |
| 5,565,142 A | | 10/1996 | Deshpande et al. |
| 5,889,071 A | | 3/1999 | Biesmans et al. |
| 5,962,539 A | | 10/1999 | Perrut et al. |
| 6,147,134 A | | 11/2000 | Eling |
| 6,187,831 B1 | | 2/2001 | Miller et al. |
| 6,315,971 B1 | | 11/2001 | Wallace et al. |
| 6,670,402 B1 | | 12/2003 | Lee et al. |
| 8,546,457 B2 | | 10/2013 | Alteheld et al. |
| 2006/0013754 A1 | * | 1/2006 | Puppe ...................... C08K 3/28 423/338 |
| 2007/0213417 A1 | | 9/2007 | Stork et al. |
| 2007/0272902 A1 | * | 11/2007 | Evans ...................... C01F 7/18 252/600 |
| 2016/0096949 A1 | * | 4/2016 | Evans ...................... C08K 3/04 521/122 |
| 2017/0341945 A1 | * | 11/2017 | Loelsberg ............. C01B 33/158 |

\* cited by examiner

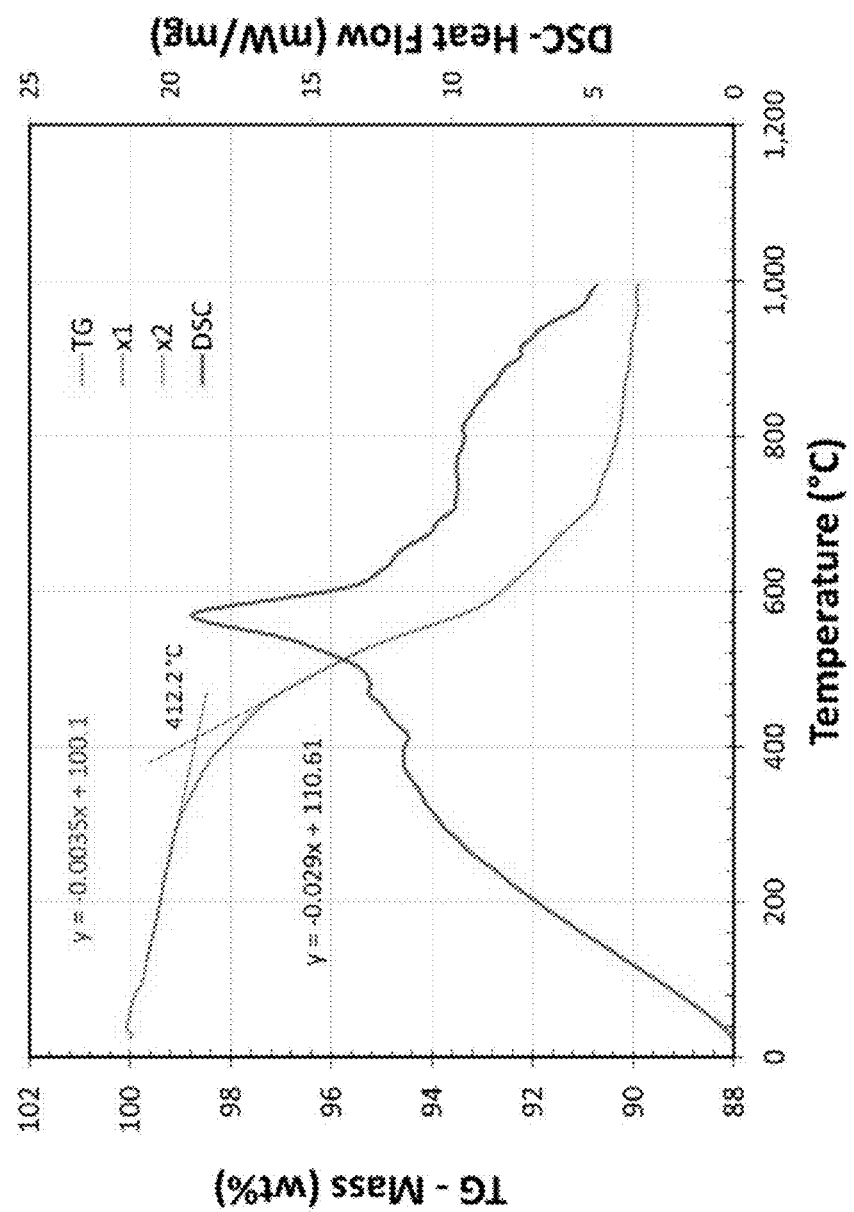

AEROGEL COMPOSITIONS AND METHODS

CROSS REFERENCE TO RELATED APPLICATIONS

This application claims the benefit of priority from U.S. Provisional Patent Application No. 63/006,003, filed Apr. 6, 2020 which is hereby incorporated by reference in its entirety, with any definitions of terms in the present application controlling.

TECHNICAL FIELD

The invention relates generally to aerogel technology. The invention relates more particularly, in various embodiments, to improved methods for producing aerogels and improved aerogel compositions.

BACKGROUND

Low-density aerogel materials are widely considered to be the best solid insulators available. Aerogels function as insulators primarily by minimizing conduction (low structural density results in tortuous path for energy transfer through the solid framework), convection (large pore volumes and very small pore sizes result in minimal convection), and radiation (IR absorbing or scattering dopants are readily dispersed throughout the aerogel matrix). Aerogels can be used in a broad range of applications, including: heating and cooling insulation, acoustics insulation, electronic dielectrics, aerospace, energy storage and production, and filtration. Furthermore, aerogel materials display many other interesting acoustic, optical, mechanical, and chemical properties that make them abundantly useful in various insulation and non-insulation applications.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present disclosure may address one or more of the problems and deficiencies of the prior art. However, it is contemplated that embodiments disclosed herein may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, otherwise constitutes prior art under the applicable statutory provisions, or is known to be relevant to an attempt to solve any problem with which this specification is concerned.

SUMMARY

The long-standing but heretofore unfulfilled need for improved aerogel compositions is now met by a new, useful, and nonobvious invention. In one general aspect, the present disclosure can provide aerogel compositions which are durable and easy to handle, which have favorable performance in aqueous environments, and which also have favorable combustion and self-heating properties. In certain embodiments, the present disclosure presents aerogel compositions which are reinforced aerogel compositions that are flexible, resilient, and self-supporting, which have favorable performance in aqueous environments, and which also have favorable combustion and self-heating properties.

A first general aspect relates to a composition including a silica-based aerogel. In exemplary embodiments, the silica-based aerogel includes hydrophobic-bound silicon, greater than 50% of the hydrophobic-bound silicon bonded to no more than one alkyl group. For example, in preferred embodiments, the silica-based aerogel is not surface-treated by a hydrophobizing agent.

A second general aspect relates to a composition including an intrinsically hydrophobic silica-based aerogel. In exemplary embodiments, the composition has a heat of combustion of less than 717 cal/g. In exemplary embodiments, the silica-based aerogel has surface groups and the surface groups consist essentially of hydrophobic groups of the formula Si—R, where R is a single methyl group.

A third general aspect relates to a composition including a silica-based aerogel, the composition including at least about 0.1 wt % of strong base or strong base derivative. For example, the composition can include at most about 2 wt % strong base or strong base derivative. The strong base or strong base derivative can include cations selected from the group consisting of lithium, calcium, sodium, potassium, rubidium, barium, strontium, and guanidinium. In exemplary embodiments, the silica-based aerogel includes hydrophobic-bound silicon, greater than 50% of the hydrophobic-bound silicon bonded to a single alkyl group. In exemplary embodiments, the composition has a water uptake in the range of about 15 wt % or less, a heat of combustion less than 717 cal/g, and an onset of thermal decomposition of hydrophobic organic materials of 400° C. or higher.

In exemplary embodiments, the composition has a water uptake in the range of about 5 wt % or less, 3 wt % or less, 2 wt % or less, or about 1 wt % or less. In some embodiments, the composition has a heat of combustion less than 717 cal/g. For example, the composition can have a heat of combustion in the range of about 700 cal/g or less, 650 cal/g or less, 600 cal/g or less, 575 cal/g or less, about 550 cal/g or less, about 500 cal/g or less, about 450 cal/g or less, about 400 cal/g or less, about 350 cal/g or less, about 300 cal/g or less, about 250 cal/g or less, about 200 cal/g or less, about 150 cal/g or less, about 100 cal/g or less, about 50 cal/g or less, about 25 cal/g or less, or about 10 cal/g or less. In an exemplary embodiment, the composition has a heat of combustion between 250 cal/g and 600 cal/g.

In exemplary embodiments, the composition can have an onset of thermal decomposition of hydrophobic organic materials of 350° C. or higher. For example, the composition has an onset of thermal decomposition of hydrophobic organic materials of 400° C. or higher or an onset of thermal decomposition of hydrophobic organic materials of 500° C. or higher.

In exemplary embodiments, the silica-based aerogel can have a content of ammonium salts in the range of about 2000 ppm or less. For example, the silica-based aerogel has a content of ammonium salts in the range of about 1000 ppm or less, 500 ppm or less, 200 ppm or less, or 100 ppm or less.

In exemplary embodiments, the silica-based aerogel can have a content of ammonium salts in the range of about 0.2 wt % or less. For example, the silica-based aerogel has a content of ammonium salts in the range of about 0.1 wt % or less. In some embodiments, the silica-based aerogel has a water uptake in the range of about 10 wt % or less, about 8 wt % or less, about 3 wt or less, about 2 wt % or less, about 1 wt % or less, or about 0.1 wt % or less.

In exemplary embodiments, the silica-based aerogel has a thermal conductivity less than about 45 mW/M*K. For example, the silica-based aerogel can have a thermal conductivity in the range of about 45 mW/M*K or less, about 40 mW/M*K or less, about 35 mW/M*K or less, about 30 mW/M*K or less, about 25 mW/M*K or less, about 20 mW/M*K or less, about 18 mW/M*K or less, about 16 mW/M*K or less, about 15 mW/M*K or less, about 14 mW/M*K or less, about 13 mW/M*K or less, about 12 mW/M*K or less, or about 5 mW/M*K to 50 mW/M*K.

In exemplary embodiments, the composition can further include a reinforcement material. For example, the reinforcement material can include a fiber reinforcement material or a foam reinforcement material.

In exemplary embodiments, the composition can include an opacifying or fire-class additive. For example, the opacifying or fire-class additive can be present in a range of about 0.1 wt % to about 10 wt % relative to the silica content of the aerogel. For example, the opacifying or fire-class additive can be present in a range of about 0.5 wt % to about 3.0 wt % relative to the silica content of the aerogel. The opacifying or fire-class additive can be selected from the group consisting of boron carbide, diatomite, manganese ferrite, manganese oxide, nickel oxide, tin oxide, silver oxide, bismuth oxide, titanium carbide, tungsten carbide, carbon black, titanium oxide, iron titanium oxide, zirconium silicate, zirconium oxide, iron oxide, iron (II) oxide, iron (III) oxide, manganese dioxide, iron titanium oxide (ilmenite), chromium oxide, silicon carbide, phyllosilicate clay, kaolin or kaolinite (aluminum silicate; $Al_2Si_2O_5(OH)_4$), metakaolin, halloysite (aluminum silicate; $Al_2Si_2O_5(OH)_4$), meta-halloysite, endellite (aluminum silicate; $Al_2Si_2O_5(OH)_4$), mica (silica minerals), diaspore (aluminum oxide hydroxide; $\alpha$-AlO(OH)), gibbsite (aluminum hydroxide), boehmite (aluminum oxide hydroxide; $\gamma$-AlO(OH)), montmorillonite, beidellite, pyrophyllite (aluminum silicate; $Al_2Si_4O_{10}(OH)_2$), nontronite, bravaisite, smectite, leverrierite, rectorite, celadonite, attapulgite, chloropal, volkonskoite, allophane, racewinite, dillnite, severite, miloschite, collyrite, cimolite and newtonite, sodium bicarbonate ($NaHCO_3$), magnesium hydroxide (or magnesium dihydroxide), alumina trihydrate, gypsum (calcium sulfate dihydrate; $CaSO_4.2H_2O$), barringtonite ($MgCO_3.2H_2O$), nesquehonite ($MgCO_3.3H_2O$), lansfordite ($MgCO_3.5H_2O$), hydromagnesite (hydrated magnesium carbonate; $Mg_5(CO_3)_4(OH)_2.4H_2O$), dolomite, lithium carbonate or combinations and mixtures thereof. In certain embodiments, the additive can include silicon carbide, e.g., in the above referenced ranges relative to the silica content of the aerogel. In certain embodiments, the additive can include metakaolin, e.g., in the above referenced ranges relative to the silica content of the aerogel.

In exemplary embodiments, the composition can further include at least about 0.1 wt % strong base or strong base derivative. For example, the composition can include at most about 2 wt % strong base or strong base derivative. The strong base or strong base derivative can include cations selected from the group consisting of lithium, calcium, sodium, potassium, rubidium, barium, strontium, and guanidinium.

A further general aspect relates to a method including providing a precursor solution comprising silica gel precursor materials and a solvent; providing a basic catalyst solution with a pKb less than about 4; combining the precursor solution and the basic catalyst solution; allowing the silica precursor materials to transition into a gel composition; and extracting at least a portion of the solvent from the gel composition to obtain a silica-based aerogel composition.

In exemplary embodiments, the precursor solution includes at least one silica gel precursor material having at least one hydrophobic group. For example, the precursor solution can include greater than 30% of at least one silica gel precursor material having a single alkyl group attached to silicon. For a further example, the precursor solution can include greater than 30% of at least one silica gel precursor material having a single methyl group attached to silicon. In any embodiment, the gel composition is not surface-treated by a hydrophobizing agent. The basis catalyst can, in exemplary embodiments, include a catalytic amount of a strong base selected from the group consisting of sodium hydroxide, lithium hydroxide, calcium hydroxide, potassium hydroxide, strontium hydroxide, barium hydroxide, guanidine hydroxide, sodium hydroxide, tetrabutylammonium hydroxide, tetramethylammonium hydroxide, choline hydroxide, phosphonium hydroxide, DABCO, DBU, guanidine derivatives, amidines, and phosphazenes.

In exemplary embodiments, the method can include incorporating a reinforcement material into the silica-based aerogel composition. The method can also include incorporating an additive into the silica-based aerogel composition. In exemplary embodiments, the additive can be present in a range of about 0.1 wt % to about 10 wt % relative to the silica content of the aerogel. For example, the additive can be present in a range of about 0.5 wt % to about 3 wt % relative to the silica content of the aerogel. The additive can be selected from the group consisting of boron carbide, diatomite, manganese ferrite, manganese oxide, nickel oxide, tin oxide, silver oxide, bismuth oxide, titanium carbide, tungsten carbide, carbon black, titanium oxide, iron titanium oxide, zirconium silicate, zirconium oxide, iron oxide, iron (II) oxide, iron (III) oxide, manganese dioxide, iron titanium oxide (ilmenite), chromium oxide, silicon carbide, phyllosilicate clay, kaolin or kaolinite (aluminum silicate; $Al_2Si_2O_5(OH)_4$), metakaolin, halloysite (aluminum silicate; $Al_2Si_2O_5(OH)_4$), meta-halloysite, endellite (aluminum silicate; $Al_2Si_2O_5(OH)_4$), mica (silica minerals), diaspore (aluminum oxide hydroxide; $\alpha$-AlO(OH)), gibbsite (aluminum hydroxide), boehmite (aluminum oxide hydroxide; $\gamma$-AlO(OH)), montmorillonite, beidellite, pyrophyllite (aluminum silicate; $Al_2Si_4O_{10}(OH)_2$), nontronite, bravaisite, smectite, leverrierite, rectorite, celadonite, attapulgite, chloropal, volkonskoite, allophane, racewinite, dillnite, severite, miloschite, collyrite, cimolite and newtonite, sodium bicarbonate ($NaHCO_3$), magnesium hydroxide (or magnesium dihydroxide), alumina trihydrate, gypsum (calcium sulfate dihydrate; $CaSO_4.2H_2O$), barringtonite ($MgCO_3·2H_2O$), nesquehonite ($MgCO_3·3H_2O$), lansfordite ($MgCO_3·5H_2O$), hydromagnesite (hydrated magnesium carbonate; $Mg_5(CO_3)_4(OH)_2·4H_2O$), dolomite, lithium carbonate or mixtures thereof. In certain embodiments, the additive can include silicon carbide, e.g., in the above referenced ranges relative to the silica content of the aerogel. In certain embodiments, the additive can include metakaolin, e.g., in the above referenced ranges relative to the silica content of the aerogel.

BRIEF DESCRIPTION OF THE DRAWINGS

For a fuller understanding of the invention, reference should be made to the following detailed description, taken in connection with the accompanying drawings, in which:

FIG. 1 is a graph depicting the TGA/DSC analysis for exemplary aerogel compositions of the present disclosure.

DETAILED DESCRIPTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly within the context in which it is presented. In an embodiment, the term "about" can include traditional rounding according to significant figures of the numerical value. In addition, the phrase "about 'x' to 'y'" includes "about 'x' to about 'y'".

As used herein, the terms "composition" and "composite" are used interchangeably.

Aerogels are a class of porous materials with open-cells comprising a framework of interconnected structures, with a corresponding network of pores integrated within the framework, and an interstitial phase within the network of pores which is primarily comprised of gases such as air. Aerogels are typically characterized by a low density, a high porosity, a large surface area, and small pore sizes. Aerogels can be distinguished from other porous materials by their physical and structural properties.

Within the context of the present disclosure, the term "aerogel" or "aerogel material" refers to a gel comprising a framework of interconnected structures, with a corresponding network of interconnected pores integrated within the framework, and containing gases such as air as a dispersed interstitial medium; and which is characterized by the following physical and structural properties (according to Nitrogen Porosimetry Testing) attributable to aerogels: (a) an average pore diameter ranging from about 2 nm to about 100 nm, (b) a porosity of at least 80% or more, and (c) a surface area of about 20 $m^2/g$ or more.

Aerogel materials of the present disclosure thus include any aerogels or other open-celled compounds which satisfy the defining elements set forth in previous paragraphs; including compounds which can be otherwise categorized as xerogels, cryogels, ambigels, microporous materials, and the like.

Aerogel materials may also be further characterized by additional physical properties, including: (d) a pore volume of about 2.0 mL/g or more, preferably about 3.0 mL/g or more; (e) a density of about 0.50 g/cc or less, preferably about 0.25 g/cc or less; and (f) at least 50% of the total pore volume comprising pores having a pore diameter of between 2 and 50 nm; though satisfaction of these additional properties is not required for the characterization of a compound as an aerogel material.

Within the context of the present disclosure, the term "innovative processing and extraction techniques" refers to methods of replacing a liquid interstitial phase in a wet-gel material with a gas such as air, in a manner which causes low pore collapse and low shrinkage to the framework structure of the gel. Drying techniques, such as ambient pressure evaporation, often introduce strong capillary pressures and other mass transfer limitations at the liquid-vapor interface of the interstitial phase being evaporated or removed. The strong capillary forces generated by liquid evaporation or removal can cause significant pore shrinkage and framework collapse within the gel material. The use of innovative processing and extraction techniques during the extraction of a liquid interstitial phase reduces the negative effects of capillary forces on the pores and the framework of a gel during liquid phase extraction.

In certain embodiments, an innovative processing and extraction technique uses near critical or super critical fluids, or near critical or super critical conditions, to extract the liquid interstitial phase from a wet-gel material. This can be accomplished by removing the liquid interstitial phase from the gel near or above the critical point of the liquid or mixture of liquids Co-solvents and solvent exchanges can be used to optimize the near critical or super critical fluid extraction process.

In certain embodiments, an innovative processing and extraction technique includes the modification of the gel framework to reduce the irreversible effects of capillary pressures and other mass transfer limitations at the liquid-vapor interface. This embodiment can include the treatment of a gel framework with functionalizing agents, which allow a gel framework to withstand or recover from any collapsing forces during liquid phase extraction conducted below the critical point of the liquid interstitial phase. This embodiment can also include the incorporation of functional groups or framework elements which provide a framework modulus which is sufficiently high to withstand or recover from collapsing forces during liquid phase extraction conducted below the critical point of the liquid interstitial phase.

Within the context of the present disclosure, the terms "framework" or "framework structure" refer to the network of interconnected oligomers, polymers or colloidal particles that form the solid structure of a gel or an aerogel. The polymers or particles that make up the framework structures typically have a diameter of about 100 angstroms. However, framework structures of the present disclosure can also include networks of interconnected oligomers, polymers or colloidal particles of all diameter sizes that form the solid structure within in a gel or aerogel. Furthermore, the terms "silica-based aerogel" or "silica-based framework" refer to an aerogel framework in which silica comprises at least 50% (by weight) of the oligomers, polymers or colloidal particles that form the solid framework structure within in the gel or aerogel.

Within the context of the present disclosure, the term "aerogel composition" refers to any composite material which includes aerogel material as a component of the composite. Examples of aerogel compositions include, but are not limited to: fiber-reinforced aerogel composites; aerogel composites which include additive elements such as opacifiers; aerogel-foam composites; aerogel-polymer composites; and composite materials which incorporate aerogel particulates, particles, granules, beads, or powders into a solid or semi-solid material, such as binders, resins, cements, foams, polymers, or similar solid materials. Aerogel compositions are generally obtained after the removal of the solvent from various gel materials disclosed in this invention. Aerogel compositions thus obtained may further be subjected to additional processing or treatment. The various gel materials may also be subjected to additional processing or treatment otherwise known or useful in the art before subjected to solvent removal (or liquid extraction or drying).

Within the context of the present invention, the term "monolithic" refers to aerogel materials in which a majority (by weight) of the aerogel included in the aerogel material or composition is in the form of a unitary interconnected aerogel nanostructure. Monolithic aerogel materials include aerogel materials which are initially formed to have a unitary interconnected gel or aerogel nanostructure, but which are subsequently cracked, fractured or segmented into non-unitary aerogel nanostructures. Monolithic aerogel materials are differentiated from particulate aerogel materials. The term "particulate aerogel material" refers to aerogel materials in which a majority (by weight) of the aerogel included in the aerogel material is in the form of particulates, particles, granules, beads, or powders, which can be combined or compressed together but which lack an interconnected aerogel nanostructure between individual particles.

Aerogel compositions of the present disclosure may include reinforced aerogel compositions. Within the context of the present disclosure, the term "reinforced aerogel composition" refers to aerogel compositions which include a reinforcing phase within the aerogel material which is not part of the aerogel framework. The reinforcing phase can be any material which provides increased flexibility, resilience, conformability or structural stability to the aerogel material. Examples of well-known reinforcing materials include, but are not limited to: open-cell microporous foam reinforcement materials, closed-cell microporous foam reinforcement materials, open-cell membranes, honeycomb reinforcement materials, polymeric reinforcement materials, and fiber reinforcement materials such as discrete fibers, woven materials, non-woven materials, battings, webs, mats, and felts. Additionally, fiber-based reinforcements may be combined with one or more of the other reinforcing materials, and can be oriented continuously throughout or in limited preferred parts of the composition.

Within the context of the present disclosure, the term "fiber-reinforced aerogel composition" refers to a reinforced aerogel composition which comprises a fiber reinforcement material as a reinforcing phase. Examples of fiber reinforcement materials include, but are not limited to, discrete fibers, woven materials, non-woven materials, battings, webs, mats, felts, or combinations thereof. Fiber reinforcement materials can comprise a range of materials, including, but not limited to: Polyesters, polyolefin terephthalates, poly (ethylene) naphthalate, polycarbonates (examples Rayon, Nylon), cotton, (e.g. lycra manufactured by DuPont), carbon (e.g. graphite), polyacrylonitriles (PAN), oxidized. PAN, uncarbonized heat treated PANs (such as those manufactured by SGL carbon), fiberglass based material (like S-glass, 901 glass, 902 glass, 475 glass, E-glass,) silica based fibers like quartz, (e.g. Quartzel manufactured by Saint-Gobain), Q-felt (manufactured by Johns Manville), Saffil (manufactured by Saffil), Durablanket (manufactured by Unifrax) and other silica fibers, Duraback (manufactured by Carborundum), Polyaramid fibers like Kevlar, Nomex, Sontera (all manufactured by DuPont), Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by W.L. GORE), Silicon carbide fibers like Nicalon (manufactured by COI Ceramics), ceramic fibers like Nextel (manufactured by 3M), crylic polymers, fibers of wool, silk, hemp, leather, suede, PBO-Zylon fibers (manufactured by Tyobo), Liquid crystal material like Vectan (manufactured by Hoechst), Cambrelle fiber (manufactured by DuPont), Polyurethanes, polyamides, Wood fibers, Boron, Aluminum, Iron Stainless Steel fibers and other thermoplastics like PEEK, PES, PEI, PEK, PPS.

Reinforced aerogel compositions of the present disclosure may comprise aerogel compositions reinforced with open-cell macroporous framework materials. Within the context of the present disclosure, the term "open-cell macroporous framework" or "OCMF" refers to a porous material comprising a framework of interconnected structures of substantially uniform composition, with a corresponding network of interconnected pores integrated within the framework; and which is characterized by an average pore diameter ranging from about 10 µm to about 700 µm Such average pore diameter may be measured by known techniques, including but not limited to, Microscopy with optical analysis. OCMF materials of the present disclosure thus include any open-celled materials that satisfy the defining elements set forth in this paragraph, including compounds that can be otherwise categorized as foams, foam-like materials, macroporous materials, and the like. OCMF materials can be differentiated from materials comprising a framework of interconnected structures that have a void volume within the framework and that do not have a uniform composition, such as collections of fibers and binders having a void volume within the fiber matrix.

Within the context of the present disclosure, the term "substantially uniform composition" refers to uniformity in the composition of the referred material within 10% tolerance.

Within the context of the present disclosure, the term "OCMF-reinforced aerogel composition" refers to a reinforced aerogel composition comprising an open-cell macroporous framework material as a reinforcing phase. Suitable OCMF materials for use in the present disclosure include, but are not limited to, OCMF materials made from organic polymeric materials. Examples include OCMF materials made from polyolefins, polyurethanes, phenolics, melamine, cellulose acetate, and polystyrene. Within the context of the present disclosure, the term "organic OCMF" refers to OCMF materials having a framework comprised primarily of organic polymeric materials. OCMF materials made from melamine or melamine derivatives are also preferred in certain embodiments. Within the context of the present disclosure, the terms "melamine OCMF" or "melamine-based OCMF" refer to organic OCMF materials having a framework comprised primarily of polymeric materials derived from reacting melamine with a condensation agent, such as formaldehyde. Examples of OCMF materials made from melamine or melamine derivatives for use in the present disclosure are presented in U.S. Pat. Nos. 8,546,457; 4,666,948; and WO 2001/094436. The term "inorganic OCMF" refers to OCMF materials having a framework comprised primarily of inorganic materials. Examples of inorganic OCMF include, but are not limited to, cementous materials, gypsum, and calcium silicate.

Within the context of the present invention, the term "foam" refers to a material comprising a framework of interconnected polymeric structures of substantially uniform composition, with a corresponding network or collection of pores integrated within the framework, and which is formed by dispersing a proportion of gas in the form of bubbles into a liquid or resin foam material such that the gas bubbles are retained as pores as the foam material solidifies into a solid structure. In general, foams can be made using a wide variety of processes—see, for example, U.S. Pat. Nos. 6,147,134; 5,889,071; 6,187,831; and 5,229,429. Foam materials of the present disclosure thus include any materials that satisfy the defining elements set forth in this paragraph, including compounds that can be otherwise categorized as OCMF materials, macroporous materials, and the like. Foams as defined in the present invention may be in the types of thermoplastics, elastomers, and thermosets (duromers).

The pores within a solid framework can also be referred to as "cells". Cells can be divided by cell walls or membranes, creating a collection of independent closed pores within the porous material. The term "closed cell" refers to porous materials in which at least 50% of the pore volume is [substantially] confined cells enclosed by membranes or walls. Cells in a material can also be interconnected through cell openings, creating a network of interconnected open pores within the material. The term "open cell" refers to porous materials in which at least 50% of the pore volume is open cells. The open-cell material may comprise a reticulated open-cell material, a non-reticulated open-cell material, or a combination thereof. Reticulated materials are open cell materials produced through a reticulation process that eliminates or punctures cell membranes within the porous material. Reticulated materials typically have a higher concentration of open cells than non-reticulated materials, but tend to be more expensive and difficult to produce. Generally, no porous material has entirely one type of cell structure (open cell or closed cell). Porous materials may be made using a wide variety of processes, including foam production processes presented in U.S. Pat. Nos. 6,147,134; 5,889,071; 6,187,831; 5,229,429; 4,454,248; and US Patent Application No 2007/0213417.

Within the context of the present disclosure, the terms "aerogel blanket" or "aerogel blanket composition" refer to aerogel compositions reinforced with a continuous sheet of reinforcement material. Aerogel blanket compositions can be differentiated from other reinforced aerogel composition which are reinforced with a non-continuous fiber or foam network, such as separated agglomerates or clumps of fiber materials. Aerogel blanket compositions are particularly useful for applications requiring flexibility, since they are highly conformable and can be used like a blanket to cover surfaces of simple or complex geometry, while also retaining the excellent thermal insulation properties of aerogels.

Within the context of the present disclosure, the term "wet gel" refers to a gel in which the mobile interstitial phase within the network of interconnected pores is primarily comprised of a liquid phase such as a conventional solvent, liquefied gases such as liquid carbon dioxide, or a combination thereof. Aerogels typically require the initial production of a wet gel, followed by innovative processing and extraction to replace the mobile interstitial liquid phase in the gel with air. Examples of wet gels include, but are not limited to: alcogels, hydrogels, ketogels, carbonogels, and any other wet gels known to those in the art.

Within the context of the present disclosure, the terms "additive" or "additive element" refer to materials which can be added to an aerogel composition before, during, or after the production of the aerogel. Additives can be added to alter or improve desirable properties in an aerogel, or to counteract undesirable properties in an aerogel. Additives are typically added to an aerogel material either prior or during gelation. Examples of additives include, but are not limited to: microfibers, fillers, reinforcing agents, stabilizers, thickeners, elastic compounds, opacifiers, coloring or pigmentation compounds, radiation absorbing compounds, radiation reflecting compounds, corrosion inhibitors, thermally conductive components, phase change materials, pH adjustors, redox adjustors, HCN mitigators, off-gas mitigators, electrically conductive compounds, electrically dielectric compounds, magnetic compounds, radar blocking components, hardeners, anti-shrinking agents, and other aerogel additives known to those in the art. Other examples of additives include smoke suppressants and fire suppressants. Published U.S. Pat. App. 2007/0272902 A1 (Paragraphs [0008] and [0010]-[0039]) includes teachings of smoke suppressants and fire suppressants, and is hereby incorporated by reference according to the individually cited paragraphs.

Within the context of the present disclosure, the terms "flexible" and "flexibility" refer to the ability of an aerogel material or composition to be bent or flexed without macrostructural failure. Preferably, aerogel compositions of the present disclosure are capable of bending at least 5°, at least 25°, at least 45°, at least 65°, or at least 85° without macroscopic failure; and/or have a bending radius of less than 4 feet, less than 2 feet, less than 1 foot, less than 6 inches, less than 3 inches, less than 2 inches, less than 1 inch, or less than ½ inch without macroscopic failure. Likewise, the terms "highly flexible" or "high flexibility" refer to aerogel materials or compositions capable of bending to at least 90° and/or have a bending radius of less than ½ inch without macroscopic failure. Furthermore, the terms "classified flexible" and "classified as flexible" refer to aerogel materials or compositions which can be classified as flexible according to ASTM classification standard C1101 (ASTM International, West Conshohocken, Pa.).

Aerogel materials or compositions of the present disclosure can be flexible, highly flexible, and/or classified flexible. Aerogel materials or compositions of the present disclosure can also be drapable. Within the context of the present disclosure, the terms "drapable" and "drapability" refer to the ability of an aerogel material or composition to be bent or flexed to 90° or more with a radius of curvature of about 4 inches or less, without macroscopic failure. An aerogel material or composition of the present disclosure is preferably flexible such that the composition is non-rigid and may be applied and conformed to three-dimensional surfaces or objects, or pre-formed into a variety of shapes and configurations to simplify installation or application.

Within the context of the present disclosure, the terms "resilient" and "resilience" refer to the ability of an aerogel material or composition to at least partially return to an original form or dimension following deformation through compression, flexing, or bending. Resilience may be complete or partial, and it may be expressed in terms of percentage return. An aerogel material or composition of the present disclosure preferably has a resilience of more than 25%, more than 50%, more than 60%, more than 70%, more than 75%, more than 80%, more than 85%, more than 90%, or more than 95% return to an original form or dimension following a deformation. Likewise, the terms "classified resilient" and "classified as resilient" refer to aerogel materials or compositions of the present disclosure which can be classified as resilient flexible according to ASTM classification standard C1101 (ASTM International, West Conshohocken, Pa.).

Within the context of the present disclosure, the term "self-supporting" refers to the ability of an aerogel material or composition to be flexible and/or resilient based primarily on the physical properties of the aerogel and any reinforcing phase in the aerogel composition. Self-supporting aerogel materials or compositions of the present disclosure can be differentiated from other aerogel materials, such as coatings, which rely on an underlying substrate to provide flexibility and/or resilience to the material.

Within the context of the present disclosure, the term "shrinkage" refers to the ratio of: 1) the difference between the measured final density of the dried aerogel material or composition and the target density calculated from solid content in the sol-gel precursor solution, relative to 2) the target density calculated from solid content in the sol-gel precursor solution. Shrinkage can be calculated by the following equation: Shrinkage=[Final Density (g/cm$^3$)–Target Density (g/cm$^3$)]/[Target Density (g/cm$^3$)]. Preferably, shrinkage of an aerogel material of the present disclosure is 50% or less, 25% or less, 10% or less, 8% or less, 6% or less, 5% or less, 4% or less, 3% or less, 2% or less, 1% or less, 0.1% or less, about 0.01% or less, or in a range between any two of these values.

Within the context of the present disclosure, the terms "thermal conductivity" and "TC" refer to a measurement of the ability of a material or composition to transfer heat between two surfaces on either side of the material or composition, with a temperature difference between the two surfaces. Thermal conductivity is specifically measured as the heat energy transferred per unit time and per unit surface area, divided by the temperature difference. It is typically recorded in SI units as mW/m*K (milliwatts per meter*Kelvin). The thermal conductivity of a material may be determined by methods known in the art, including, but not limited to: Test Method for Steady-State Thermal Transmission Properties by Means of the Heat Flow Meter Apparatus (ASTM C518, ASTM International, West Conshohocken, Pa.); a Test Method for Steady-State Heat Flux Measurements and Thermal Transmission Properties by Means of the Guarded-Hot-Plate Apparatus (ASTM C177, ASTM International, West Conshohocken, Pa.); a Test Method for Steady-State Heat Transfer Properties of Pipe Insulation (ASTM C335, ASTM International, West Conshohocken, Pa.); a Thin Heater Thermal Conductivity Test (ASTM C1114, ASTM International, West Conshohocken, Pa.); Determination of thermal resistance by means of guarded hot plate and heat flow meter methods (EN 12667, British Standards Institution, United Kingdom); or Determination of steady-state thermal resistance and related properties—Guarded hot plate apparatus (ISO 8203, International Organization for Standardization, Switzerland). Within the context of the present disclosure, thermal conductivity measurements are acquired according to ASTM C177 standards, at a temperature of about 37.5° C. at atmospheric pressure, and a compression of about 2 psi, unless otherwise stated. Preferably, aerogel materials or compositions of the present disclosure have a thermal conductivity of about 50 mW/mK or less, about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values.

Within the context of the present disclosure, the term "density" refers to a measurement of the mass per unit volume of an aerogel material or composition. The term "density" generally refers to the true density of an aerogel material, as well as the bulk density of an aerogel composition. Density is typically recorded as kg/m$^3$ or g/cc. The density of an aerogel material or composition may be determined by methods known in the art, including, but not limited to: Standard Test Method for Dimensions and Density of Preformed Block and Board-Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present disclosure, density measurements are acquired according to ASTM C167 standards, unless otherwise stated. Preferably, aerogel materials or compositions of the present disclosure have a density of about 0.60 g/cc or less, about 0.50 g/cc or less, about 0.40 g/cc or less, about 0.30 g/cc or less, about 0.25 g/cc or less, about 0.20 g/cc or less, about 0.18 g/cc or less, about 0.16 g/cc or less, about 0.14 g/cc or less, about 0.12 g/cc or less, about 0.10 g/cc or less, about 0.05 g/cc or less, about 0.01 g/cc or less, or in a range between any two of these values.

Within the context of the present disclosure, the term "hydrophobicity" refers to a measurement of the ability of an aerogel material or composition to repel water.

Hydrophobicity of an aerogel material or composition can be expressed in terms of the liquid water uptake. Within the context of the present disclosure, the term "liquid water uptake" refers to a measurement of the potential of an aerogel material or composition to absorb or otherwise retain liquid water. Liquid water uptake can be expressed as a percent (by weight or by volume) of water which is absorbed or otherwise retained by an aerogel material or composition when exposed to liquid water under certain measurement conditions. The liquid water uptake of an aerogel material or composition may be determined by methods known in the art, including, but not limited to: Standard Test Method for Determining the Water Retention (Repellency) Characteristics of Fibrous Glass Insulation (ASTM C1511, ASTM International, West Conshohocken, Pa.); Standard Test Method for Water Absorption by Immersion of Thermal Insulation Materials (ASTM C1763, ASTM International, West Conshohocken, Pa.); Thermal insulating products for building applications: Determination of short term water absorption by partial immersion (EN 1609, British Standards Institution, United Kingdom). Due to different methods possibly resulting in different results, it should be understood that within the context of the present disclosure, measurements of liquid water uptake are acquired according to ASTM C1511 standards, under ambient pressure and temperature, unless otherwise stated. In certain embodiments, aerogel materials or compositions of the present disclosure can have a liquid water uptake of according to ASTM C1511 of about 100 wt % or less, about 80 wt % or less, about 60 wt % or less, about 50 wt % or less, about 40 wt % or less, about 30 wt % or less, about 20 wt % or less, about 15 wt % or less, about 10 wt % or less, about 8 wt % or less, about 5 wt % about 3 wt % or less, about 2 wt % or less, about 1 wt % or less, about 0.1 wt % or less, or in a range between any two of these values. Aerogel materials or compositions of the present disclosure can have a liquid water uptake of according to ASTM C1763 of about 100 vol wt % or less, about 80 wt % or less, about 60 wt % or less, about 50 wt % or less, about 40 wt % or less, about 30 wt % or less, about 20 wt % or less, about 15 wt % or less, about 10 wt % or less, about 8 wt % or less, about 5 wt % about 3 wt % or less, about 2 wt % or less, about 1 wt % or less, about 0.1 wt % or less, or in a range between any two of these values. An aerogel material or composition which has improved liquid water uptake relative to another aerogel material or composition will have a lower percentage of liquid water uptake/retention relative to the reference aerogel materials or compositions.

Hydrophobicity of an aerogel material or composition can be expressed in terms of the water vapor uptake. Within the context of the present disclosure, the term "water vapor uptake" refers to a measurement of the potential of an aerogel material or composition to absorb water vapor. Water vapor uptake can be expressed as a percent (by weight) of water which is absorbed or otherwise retained by an aerogel material or composition when exposed to water vapor under certain measurement conditions. The water vapor uptake of an aerogel material or composition may be determined by methods known in the art, including, but not limited to: Standard Test Method for Determining the Water Vapor Sorption of Unfaced Mineral Fiber Insulation (ASTM C1104, ASTM International, West Conshohocken, Pa.). Due to different methods possibly resulting in different results, it should be understood that within the context of the present disclosure, measurements of water vapor uptake are acquired according to ASTM C1104 standards, under ambient pressure and temperature, unless otherwise stated. Preferably, aerogel materials or compositions of the present disclosure can have a water vapor uptake of about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition which has improved water vapor uptake relative to another aerogel material or composition will have a lower percentage of water vapor uptake/retention relative to the reference aerogel materials or compositions.

Hydrophobicity of an aerogel material or composition can be expressed by measuring the equilibrium contact angle of a water droplet at the interface with the surface of the material. Aerogel materials or compositions of the present disclosure can have a water contact angle of about 90° or more, about 120° or more, about 130° or more, about 140° or more, about 150° or more, about 160° or more, about 170° or more, about 175° or more, or in a range between any two of these values.

Within the context of the present disclosure, the terms "heat of combustion" and "HOC" refer to a measurement of the amount of heat energy released in the combustion of an aerogel material or composition. Heat of combustion is typically recorded in calories of heat energy released per gram of aerogel material or composition (cal/g), or as megajoules of heat energy released per kilogram of aerogel material or composition (MJ/kg). The heat of combustion of a material or composition may be determined by methods known in the art, including, but not limited to: Reaction to fire tests for products—Determination of the gross heat of combustion (calorific value) (ISO 1716, International Organization for Standardization, Switzerland). Within the context of the present disclosure, heat of combustion measurements are acquired according to conditions comparable to ISO 1716 standards, unless otherwise stated. Preferably, aerogel compositions of the present disclosure can have a heat of combustion of about 750 cal/g or less, about 717 cal/g or less, about 700 cal/g or less, about 650 cal/g or less, about 600 cal/g or less, about 575 cal/g or less, about 550 cal/g or less, about 500 cal/g or less, about 450 cal/g or less, about 400 cal/g or less, about 350 cal/g or less, about 300 cal/g or less, about 250 cal/g or less, about 200 cal/g or less, about 150 cal/g or less, about 100 cal/g or less, about 50 cal/g or less, about 25 cal/g or less, about 10 cal/g or less, or in a range between any two of these values. An aerogel composition which has an improved heat of combustion relative to another aerogel composition will have a lower heat of combustion value, relative to the reference aerogel compositions. In certain embodiments of the present disclosure, the HOC of an aerogel composite is improved by incorporating a fire-class additive into the aerogel composite.

Within the context of the present disclosure, all thermal analyses and related definitions are referenced with measurements performed by starting at 25° C. and ramping at a rate of 20° C. per minute up to 1000° C. in air at ambient pressure. Accordingly, any changes in these parameters will have to be accounted for (or re-performed under these conditions) in measuring and calculating onset of thermal decomposition, temperature of peak heat release, temperature of peak hear absorption and the like. Within the context of the present disclosure, the terms "onset of thermal decomposition of hydrophobic organic material", "onset of thermal decomposition" and "$T_d$" refer to a measurement of the lowest temperature of environmental heat at which rapid exothermic reactions from the decomposition of hydrophobic organic material appear within a material or composition. The onset of thermal decomposition of a material or composition may be measured using thermo-gravimetric analysis (TGA). The TGA curve of a material depicts the weight loss (% mass) of a material as it is exposed to an increase in surrounding temperature. The onset of thermal decomposition of a material can be correlated with the intersection point of the following tangent lines of the TGA curve: a line tangent to the base line of the TGA curve, and a line tangent to the TGA curve at the point of maximum slope during the rapid decomposition event related to the decomposition of hydrophobic organic material. Within the context of the present disclosure, measurements of the onset of thermal decomposition of hydrophobic organic material are acquired using TGA analysis as provided in this paragraph, unless otherwise stated.

The onset of thermal decomposition of a material may also be measured using differential scanning calorimetry (DSC) analysis. The DSC curve of a material depicts the heat energy (mW/mg) released by a material as it is exposed to a gradual increase in surrounding temperature. The onset of thermal decomposition temperature of a material can be correlated with the point in the DSC curve where the Δ mW/mg (change in the heat energy output) maximally increases, thus indicating exothermic heat production from the aerogel material. Within the context of the present disclosure, measurements of onset of thermal decomposition using DSC, TGA, or both are acquired using a temperature ramp rate of 20° C./min as further defined in the previous paragraph, unless otherwise stated expressly. DSC and TGA each provide similar values for this onset of thermal decomposition, and many times, the tests are run concurrently, so that results are obtained from both. In certain embodiments, aerogel materials or compositions of the present disclosure have an onset of thermal decomposition of about 300° C. or more, about 320° C. or more, about 340° C. or more, about 360° C. or more, about 380° C. or more, about 400° C. or more, about 415° C. or more, about 420° C. or more, about 440° C. or more, about 460° C. or more, about 480° C. or more, about 500° C. or more, about 550° C. or more, about 575° C. or more, about 600° C. or more, or in a range between any two of these values. Within the context herein, for example, a first composition having an onset of thermal decomposition that is higher than an onset of thermal decomposition of a second composition, would be considered an improvement of the first composition over the second composition. It is contemplated herein that onset of thermal decomposition of a composition or material is increased when adding one or more fire-class additives, as compared to a composition that does not include any fire-class additives.

Within the context of the present disclosure, the terms "onset of thermal decomposition" refers to a measurement of the lowest temperature of environmental heat at which endothermic reactions from decomposition or dehydration appear within a material or composition. The onset of thermal decomposition of a material or composition may be measured using thermo-gravimetric analysis (TGA). The TGA curve of a material depicts the weight loss (% mass) of a material as it is exposed to an increase in surrounding temperature. The onset of thermal decomposition of a material may be correlated with the intersection point of the following tangent lines of the TGA curve: a line tangent to the base line of the TGA curve, and a line tangent to the TGA curve at the point of maximum slope during the rapid endothermic decomposition or dehydration of the material. For example, FIG. 1 is a graph depicting the TGA/DSC analysis for exemplary aerogel compositions of the present disclosure. The onset of thermal decomposition of the exemplary aerogel composition analyzed in FIG. 1 is about 412° C. based on the tangent line technique discussed herein. Within the context of the present disclosure, measurements of the onset of endothermic decomposition of a material or composition are acquired using TGA analysis as provided in this paragraph, unless otherwise stated.

Within the context of the present disclosure, the terms "furnace temperature rise" and "ΔTR" refer to a measurement of the difference between a maximum temperature (TMAX) of a material or composition under thermal decomposition conditions relative to a baseline temperature of that material or composition under the thermal decomposition conditions (usually the final temperature, or TFIN). Furnace temperature rise is typically recorded in degrees Celsius, or ° C. The furnace temperature rise of a material or composition may be determined by methods known in the art, including, but not limited to Reaction to fire tests for building and transport products: Non-combustibility test (EN ISO 1182, International Organization for Standardization, Switzerland; EN adopted). Within the context of the present disclosure, furnace temperature rise measurements are acquired according to conditions comparable to EN ISO 1182 standard (Reaction to fire tests for building and transport products: Non-combustibility test), unless otherwise stated. In certain embodiments, aerogel compositions of the present disclosure can have a furnace temperature rise of about 100° C. or less, about 90° C. or less, about 80° C. or less, about 70° C. or less, about 60° C. or less, about 50° C. or less, about 45° C. or less, about 40° C. or less, about 38° C. or less, about 36° C. or less, about 34° C. or less, about 32° C. or less, about 30° C. or less, about 28° C. or less, about 26° C. or less, about 24° C. or less, or in a range between any two of these values. Within the context of compositional stability at elevated temperatures, for example, a first composition having a furnace temperature rise that is lower than a furnace temperature rise of a second composition, would be considered an improvement of the first composition over the second composition. It is contemplated herein that furnace temperature rise of a composition is reduced when adding one or more fire-class additives, as compared to a composition that does not include any fire-class additives.

Within the context of the present disclosure, the terms "flame time" and "TFLAME" refer to a measurement of sustained flaming of a material or composition under thermal decomposition conditions, where "sustained flaming" is a persistence of flame at any part on the visible part of the specimen lasting 5 seconds or longer. Flame time is typically recorded in seconds or minutes. The flame time of a material or composition may be determined by methods known in the art, including, but not limited to Reaction to fire tests for building and transport products: Non-combustibility test (EN ISO 1182, International Organization for Standardization, Switzerland; EN adopted). Within the context of the present disclosure, flame time measurements are acquired according to conditions comparable to EN ISO 1182 standard (Reaction to fire tests for building and transport products: Non-combustibility test), unless otherwise stated. In certain embodiments, aerogel compositions of the present disclosure have a flame time of about 30 seconds or less, about 25 seconds or less, about 20 seconds or less, about 15 seconds or less, about 10 seconds or less, about 5 seconds or less, about 2 seconds or less, or in a range between any two of these values. Within the context herein, for example, a first composition having a flame time that is lower than a flame time of a second composition, would be considered an improvement of the first composition over the second composition. It is contemplated herein that flame time of a composition is reduced when adding one or more fire-class additives, as compared to a composition that does not include any fire-class additives.

Within the context of the present disclosure, the terms "mass loss" and "ΔM" refer to a measurement of the amount of a material, composition, or composite that is lost or burned off under thermal decomposition conditions. Mass loss is typically recorded as weight percent or wt %. The mass loss of a material, composition, or composite may be determined by methods known in the art, including, but not limited to: Reaction to fire tests for building and transport products: Non-combustibility test (EN ISO 1182, International Organization for Standardization, Switzerland; EN adopted). Within the context of the present disclosure, mass loss measurements are acquired according to conditions comparable to EN ISO 1182 standard (Reaction to fire tests for building and transport products: Non-combustibility test), unless otherwise stated. In certain embodiments, aerogel compositions of the present disclosure can have a mass loss of about 50% or less, about 40% or less, about 30% or less, about 28% or less, about 26% or less, about 24% or less, about 22% or less, about 20% or less, about 18% or less, about 16% or less, or in a range between any two of these values. Within the context herein, for example, a first composition having a mass loss that is lower than a mass loss of a second composition would be considered an improvement of the first composition over the second composition. It is contemplated herein that mass loss of a composition is reduced when adding one or more fire-class additives, as compared to a composition that does not include any fire-class additives.

Within the context of the present disclosure, the terms "temperature of peak heat release" refers to a measurement of the temperature of environmental heat at which exothermic heat release from decomposition is at the maximum. The temperature of peak heat release of a material or composition may be measured using TGA analysis, differential scanning calorimetry (DSC) or a combination thereof. DSC and TGA each would provide similar values for temperature of peak heat release, and many times, the tests are run concurrently, so that results are obtained from both. In a typical DSC analysis, heat flow is plotted against the rising temperature and temperature of peak heat release is the temperature at which the highest peak in such curve occurs. Within the context of the present disclosure, measurements of the temperature of peak heat release of a material or composition are acquired using TGA analysis as provided in this paragraph, unless otherwise stated.

Within the context of the present disclosure, the term "low-flammability" and "low-flammable" refer to a material or composition which satisfy the following combination of properties: i) a furnace temperature rise of 50° C. or less; ii) a flame time of 20 seconds or less; and iii) a mass loss of 50 wt % or less. Within the context of the present disclosure, the term "non-flammability" and "non-flammable" refer to a material or composition which satisfy the following combination of properties: i) a furnace temperature rise of 40° C. or less; ii) a flame time of 2 seconds or less; and iii) a mass loss of 30 wt % or less. It is contemplated that flammability (e.g., combination of furnace temperature rise, flame time, and mass loss) of a composition is reduced upon inclusion of one or more fire-class additives, as described herein.

Within the context of the present disclosure, the term "low-combustibility" and "low-combustible" refer to a low-flammable material or composition which has a total heat of combustion (HOC) less than or equal to 3 MJ/kg. Within the context of the present disclosure, the term "non-combustibility" and "non-combustible" refer to a non-flammable material or composition which has the heat of combustion (HOC) less than or equal to 2 MJ/kg. It is contemplated that HOC of a composition is reduced upon inclusion of one or more fire-class additives, as described herein.

Aerogels are described as a framework of interconnected structures which are most commonly comprised of interconnected oligomers, polymers or colloidal particles. An aerogel framework can be made from a range of precursor materials, including: inorganic precursor materials (such as precursors used in producing silica-based aerogels); organic precursor materials (such precursors used in producing carbon-based aerogels); hybrid inorganic/organic precursor materials; and combinations thereof. Within the context of the present disclosure, the term "amalgam aerogel" refers to an aerogel produced from a combination of two or more different gel precursors.

Inorganic aerogels are generally formed from metal oxide or metal alkoxide materials. The metal oxide or metal alkoxide materials can be based on oxides or alkoxides of any metal that can form oxides. Such metals include, but are not limited to: silicon, aluminum, titanium, zirconium, hafnium, yttrium, vanadium, cerium, and the like. Inorganic silica aerogels are traditionally made via the hydrolysis and condensation of silica-based alkoxides (such as tetraethoxylsilane), or via gelation of silicic acid or water glass. Other relevant inorganic precursor materials for silica based aerogel synthesis include, but are not limited to: metal silicates such as sodium silicate or potassium silicate, alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, polyethyl silicates, partially hydrolyzed polyethysilicates, monomeric alkylalkoxy silanes, bis-trialkoxy alkyl or aryl silanes, polyhedral silsesquioxanes, or combinations thereof.

In certain embodiments of the present disclosure, pre-hydrolyzed TEOS, such as Silbond H-5 (SBH5, Silbond Corp), which is hydrolyzed with a water/silica ratio of about 1.9-2, may be used as commercially available or may be further hydrolyzed prior to incorporation into the gelling process. Partially hydrolyzed TEOS or TMOS, such as polyethysilicate (Silbond 40) or polymethylsilicate may also be used as commercially available or may be further hydrolyzed prior to incorporation into the gelling process.

Inorganic aerogels can also include gel precursors which comprise at least one hydrophobic group, such as alkyl metal alkoxides, cycloalkyl metal alkoxides, and aryl metal alkoxides, which can impart or improve certain properties in the gel such as stability and hydrophobicity. Inorganic silica aerogels can specifically include hydrophobic precursors such as alkylsilanes or arylsilanes. Hydrophobic gel precursors can be used as primary precursor materials to form the framework of a gel material. However, hydrophobic gel precursors are more commonly used as co-precursors in combination with simple metal alkoxides in the formation of amalgam aerogels. Hydrophobic inorganic precursor materials for silica based aerogel synthesis include, but are not limited to: trimethyl methoxysilane [TMS], dimethyl dimethoxysilane [DMS], methyl trimethoxysilane [MTMS], trimethyl ethoxysilane, dimethyl diethoxysilane [DIVIDES], methyl triethoxysilane [MTES], ethyl triethoxysilane [ETES], diethyl diethoxysilane, ethyl triethoxysilane, propyl trimethoxysilane, propyl triethoxysilane, phenyl trimethoxysilane, phenyl triethoxysilane [PhTES], hexamethyldisilazane and hexaethyldisilazane, and the like.

In exemplary embodiments, the relative amount of hydrophobic gel precursor or precursors to other inorganic precursor materials is selected to provide an aerogel material or composition having hydrophobic properties as disclosed herein while maintaining other properties such as thermal conductivity, heat of combustion, onset of thermal decomposition, and/or processability. For example, the use of lower amounts of hydrophobic gel precursor or precursors can reduce the hydrophobic properties, e.g., provide a material having a higher liquid water uptake or water vapor uptake. For another example, the use of higher amounts of hydrophobic gel precursor or precursors can negatively impact thermal conductivity, combustion and/or self-heating properties. In exemplary embodiments, hydrophobic aerogel materials and compositions of the present disclosure can have a hydrophobe content of about 20 wt %, about 30 wt %, about 40 wt %, about 50 wt % or in a range between any two of these values. For example, an exemplary aerogel composition has a hydrophobe content of about 36 wt %.

Within the context of the present disclosure, hydrophobe content from hydrophobic gel precursor is defined based on the ratio of the weight contribution of hydrolysis product of hydrophobic gel precursor to the total weight contribution of all solids after hydrolysis. Table 1, below, illustrates exemplary compositions including TEOS, DIVIDES and MTES that provide a hydrophobe content of about 36 wt %±2 wt %.

TABLE 1

| Hydrophobe Content (wt %) | TEOS (grams) | TEOS (moles) | DMDES (grams) | DMDES (moles) | MTES (grams) | MTES (moles) |
|---|---|---|---|---|---|---|
| 38% | 100 | 0.480 | 5.29 | 0.036 | 39.90 | 0.224 |
| 36% | 100 | 0.480 | 4.86 | 0.033 | 36.62 | 0.205 |
| 34% | 100 | 0.480 | 4.45 | 0.030 | 33.54 | 0.188 |

Table 2, below, illustrates exemplary compositions including S40, DMDES and MTES that provide a hydrophobe content of about 36 wt %±2 wt %.

TABLE 2

| Hydrophobe Content (wt %) | S40 (grams) | S40 (moles) | DMDES (grams) | DMDES (moles) | MTES (grams) | MTES (moles) |
|---|---|---|---|---|---|---|
| 38% | 100 | — | 7.44 | 0.050 | 56.11 | 0.315 |
| 36% | 100 | — | 6.83 | 0.046 | 51.50 | 0.289 |
| 34% | 100 | — | 6.26 | 0.042 | 47.17 | 0.265 |

Aerogels may also be treated to impart or improve hydrophobicity. However, embodiments of aerogel compositions according to the present disclosure have hydrophobic properties without any additional treatment to provide such properties. Within the context of the present disclosure, the term "intrinsically hydrophobic" refers to aerogels having hydrophobic properties according to embodiments disclosed herein without treatment, e.g, treatment of the wet gel and/or treatment of the dried aerogel form, to impart or improve hydrophobicity.

For example, aerogels and aerogel compositions according to embodiments disclosed herein can have hydrophobic properties in combination with other disclosed properties, e.g., heat of combustion, onset of thermal decomposition, or combinations of such properties, based solely on hydrophobicity provided by components of the gel precursors. In such embodiments, the gel precursors provide an amount of hydrophobic-bound silicon sufficient to provide an aerogel composition having hydrophobicity in terms of the ranges of liquid water uptake and water vapor uptake disclosed herein without further treatment with a hydrophobizing agent (such as HMDZ).

Within the context of the present disclosure, the term "hydrophobic-bound silicon" refers to a silicon atom within the framework of a gel or aerogel which comprises at least one hydrophobic group covalently bonded to the silicon atom. Examples of hydrophobic-bound silicon include, but are not limited to, silicon atoms in silica groups within the gel framework which are formed from gel precursors comprising at least one hydrophobic group (such as MTES or DMDES). In exemplary embodiments, aerogel compositions resulting from the hydrophobic gel precursor or precursors disclosed herein can have surface groups that include hydrophobic groups of the formula Si—R, where R is an alkyl group. For example, hydrophobic groups of the present disclosure include, but are not limited to, methyl groups, ethyl groups, propyl groups, isopropyl groups, butyl groups, isobutyl groups, tertbutyl groups, octyl groups, phenyl groups, or other substituted or unsubstituted hydrophobic organic groups known to those with skill in the art. Within the context of the present disclosure, the terms "hydrophobic group," "hydrophobic organic material," and "hydrophobic organic content" specifically exclude readily hydrolysable organic silicon-bound alkoxy groups on the framework of the gel material which are the product of reactions between organic solvents and silanol groups. Such excluded groups are distinguishable from hydrophobic organic content of this disclosure through NMR analysis.

Within the context of the present disclosure, the terms "aliphatic hydrophobic group," "aliphatic hydrophobic organic material," and "aliphatic hydrophobic organic content" describe hydrophobic groups on hydrophobic-bound silicon which are limited to aliphatic hydrocarbons, including, but not limited to hydrocarbon moieties containing 1-40 carbon atoms which can be saturated or unsaturated (but not aromatic), which can include straight-chain, branched, cyclic moieties (including fused, bridging, and spiro-fused polycyclic), or combinations thereof, such as alkyl, alkenyl, alkynyl, (cycloalkyl)alkyl, (cycloalkenyl)alkyl, or (cycloalkyl)alkenyl moieties, and hetero-aliphatic moieties (wherein one or more carbon atoms are independently replaced by one or more atoms selected from the group consisting of oxygen, sulfur, nitrogen, or phosphorus). In certain embodiments of the present disclosure, at least 50% of the hydrophobic organic material in the aerogel composition comprises aliphatic hydrophobic groups.

The amount of hydrophobic-bound silicon contained in an aerogel can be analyzed using NMR spectroscopy, such as CP/MAS $^{29}$Si Solid State NMR. An NMR analysis of an aerogel allows for the characterization and relative quantification of: M-type hydrophobic-bound silicon (monofunctional silica, such as TMS derivatives); D-type hydrophobic-bound silicon (bifunctional silica, such as DIVIDES derivatives); T-type hydrophobic-bound silicon (trifunctional silica, such as MTES derivatives); and Q-type silicon (quadfunctional silica, such as TEOS derivatives). NMR analysis can also be used to analyze the bonding chemistry of hydrophobic-bound silicon contained in an aerogel by allowing for categorization of specific types of hydrophobic-bound silicon into sub-types (such as the categorization of T-type hydrophobic-bound silicon into $T^1$ species, $T^2$ species, and $T^3$ species). Specific details related to the NMR analysis of silica materials can be found in the article "Applications of Solid-State NMR to the Study of Organic/Inorganic Multicomponent Materials" by Geppi et al., specifically pages 7-9 (Appl. Spec. Rev. (2008), 44-1: 1-89), which is hereby incorporated by reference according to the specifically cited pages.

The characterization of hydrophobic-bound silicon in a CP/MAS$^{29}$Si NMR analysis can be based on the following chemical shift peaks: $M^1$ (30 to 10 ppm); $D^1$ (10 to −10 ppm), $D^2$ (−10 to −20 ppm); $T^1$ (−30 to −40 ppm), $T^2$ (−40 to −50 ppm), $T^3$ (−50 to −70 ppm); $Q^2$ (−70 to −85 ppm), $Q^3$ (−85 to −95 ppm), $Q^4$ (−95 to −110 ppm). These chemical shift peaks are approximate and exemplary, and are not intended to be limiting or definitive. The precise chemical shift peaks attributable to the various silicon species within a material can depend on the specific chemical components of the material, and can generally be deciphered through routine experimentation and analysis by those in the art.

The aerogel materials of the present disclosure can have a ratio of $T^{1-2}:T^3$ of between about 0.01 and about 0.5, between about 0.01 and about 0.3, or between about 0.1 and about 0.3. A ratio of $T^{1-2}:T^3$ represents a ratio of a combination of $T^1$ and $T^2$ species relative to $T^3$ species. The amount of $T^1$, $T^2$ and $T^3$ can quantified by the integral of the individual chemical shift peaks respectively associated with $T^1$ species, $T^2$ species or $T^3$ species in a $^{29}$Si NMR analysis, as previously defined. The aerogel materials of the present disclosure can have a ratio of $Q^{2-3}:Q^4$ of between about 0.1 and 2.5, between about 0.1 and 2.0, between about 0.1 and 1.5, between about 0.1 and 1.0, or between about 0.5 and 1.0. A ratio of $Q^{2-3}:Q^4$ represents a ratio of a combination of $Q^2$ and $Q^3$ species relative to $Q^4$ species. The amount of $Q^2$, $Q^3$ and $Q^4$ can quantified by the integral of the individual chemical shift peak respectively associated with $Q^2$ species, $Q^3$ species or $Q^4$ species in a $^{29}$Si NMR analysis, as previously defined.

Within the context of the present disclosure, the term "hydrophobic organic content" or "hydrophobe content" or "hydrophobic content" refers to the amount of hydrophobic organic material bound to the framework in an aerogel material or composition. The hydrophobic organic content of an aerogel material or composition can be expressed as a weight percentage of the amount of hydrophobic organic material on the aerogel framework relative to the total amount of material in the aerogel material or composition. Hydrophobic organic content can be calculated by those with ordinary skill in the art based on the nature and relative concentrations of materials used in producing the aerogel material or composition. Hydrophobic organic content can also be measured using thermo-gravimetric analysis (TGA) in an inert atmosphere. Specifically, the percentage of hydrophobic organic material in an aerogel can be correlated with the percentage of weight loss in a hydrophobic aerogel material or composition when subjected to combustive heat temperatures during a TGA analysis, with adjustments being made for the loss of moisture, loss of residual solvent, and the loss of readily hydrolysable alkoxy groups during the TGA analysis. Other alternative techniques such as differential scanning calorimetry, elemental analysis (particularly, carbon), chromatographic techniques, nuclear magnetic resonance spectra and other analytical techniques known to person of skilled in the art may be used to measure and determine hydrophobe content in the aerogel compositions of the present invention. In certain instances, a combination of the known techniques may be useful or necessary in determining the hydrophobe content of the aerogel compositions of the present invention.

Aerogel materials or compositions of the present disclosure can have a hydrophobic organic content of 50 wt % or less, 40 wt % or less, 30 wt % or less, 25 wt % or less, 20 wt % or less, 15 wt % or less, 10 wt % or less, 8 wt % or less, 6 wt % or less, 5 wt % or less, 4 wt % or less, 3 wt % or less, 2 wt % or less, 1 wt % or less, or in a range between any two of these values.

The term "fuel content" refers to the total amount of combustible material in an aerogel material or composition, which can be correlated with the total percentage of weight loss in an aerogel material or composition when subjected to combustive heat temperatures during a TGA or TG-DSC analysis, with adjustments being made for the loss of moisture. The fuel content of an aerogel material or composition can include hydrophobic organic content, as well as other combustible materials such as residual alcoholic solvents, filler materials, reinforcing materials, and readily hydrolysable alkoxy groups.

In certain embodiments, aerogels of the present disclosure are inorganic silica aerogels formed primarily from prepolymerized silica precursors preferably as oligomers, or hydrolyzed silicate esters formed from silicon alkoxides in an alcohol solvent. In certain embodiments, such prepolymerized silica precursors or hydrolyzed silicate esters may be formed in situ from other precursors or silicate esters such as alkoxy silanes or water glass. However, the disclosure as a whole may be practiced with any other aerogel compositions known to those in the art, and is not limited to any one precursor material or amalgam mixture of precursor materials.

As discussed in general above, in exemplary embodiments of the present disclosure, aerogels can be formed from gel precursors or combinations of gel precursors which comprise at least one hydrophobic group. Such aerogels, e.g., inorganic aerogels such as silica-based aerogels, can include hydrophobic-bound silicon. For example, the source of the hydrophobic-bound silicon in the aerogel can be the hydrophobic precursor material or materials. In embodiments of the present disclosure, aerogels formed from such precursors can be hydrophobic. In some embodiments, aerogels formed from such precursors can be intrinsically hydrophobic.

Within the context of the present disclosure, the term "intrinsically hydrophobic" refers to a material that possesses hydrophobicity without modification by a hydrophobizing agent. For example, aerogels can be treated to impart or improve hydrophobicity. Hydrophobic treatment can be applied to a sol-gel solution, a wet-gel prior to liquid phase extraction, or to an aerogel subsequent to liquid phase extraction. Hydrophobic treatment can be carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound can react with hydroxyl groups on the gel according the following reaction: $R_NMX_{4-N}$(hydrophobizing agent)+MOH (silanol) →$MOMR_N$ (hydrophobic group)+HX. Hydrophobic treatment can take place both on the outer macro-surface of a silica gel, as well as on the inner-pore surfaces within the porous network of a gel. Published US Pat. App. 2016/0096949 A1 (Paragraphs [0044]-[0048]) teaches hydrophobic treatments and is hereby incorporated by reference according to the individually cited paragraphs. However, as discussed above, aerogels according to embodiments of the present disclosure are hydrophobic without hydrophobic treatment, e.g., without treatment by a hydrophobizing agent.

Production of an aerogel generally includes the following steps: i) formation of a sol-gel solution; ii) formation of a gel from the sol-gel solution; and iii) extracting the solvent from the gel materials through innovative processing and extraction, to obtain a dried aerogel material. This process is discussed below in greater detail, specifically in the context of forming inorganic aerogels such as silica aerogels. However, the specific examples and illustrations provided herein are not intended to limit the present disclosure to any specific type of aerogel and/or method of preparation. The present disclosure can include any aerogel formed by any associated method of preparation known to those in the art.

The first step in forming an inorganic aerogel is generally the formation of a sol-gel solution through hydrolysis and condensation of metal alkoxide precursors in an alcohol-based solvent. Major variables in the formation of inorganic aerogels include the type of alkoxide precursors included in the sol-gel solution, the nature of the solvent, the processing temperature and pH of the sol-gel solution (which may be altered by addition of an acid or a base), and precursor/solvent/water ratio within the sol-gel solution. Control of these variables in forming a sol-gel solution can permit control of the growth and aggregation of the gel framework during the subsequent transition of the gel material from the "sol" state to the "gel" state. While properties of the resulting aerogels are affected by the pH of the precursor solution and the molar ratio of the reactants, any pH and any molar ratios that permit the formation of gels may be used in the present disclosure.

A sol-gel solution is formed by combining at least one gelling precursor with a solvent. Suitable solvents for use in forming a sol-gel solution include lower alcohols with 1 to 6 carbon atoms, preferably 2 to 4, although other solvents can be used as known to those with skill in the art. Examples of useful solvents include, but are not limited to: methanol, ethanol, isopropanol, ethyl acetate, ethyl acetoacetate, acetone, dichloromethane, tetrahydrofuran, and the like. Multiple solvents can also be combined to achieve a desired level of dispersion or to optimize properties of the gel material. Selection of optimal solvents for the sol-gel and gel formation steps thus depends on the specific precursors, fillers and additives being incorporated into the sol-gel solution; as well as the target processing conditions for gelling and liquid phase extraction, and the desired properties of the final aerogel materials.

Water can also be present in the precursor-solvent solution. The water acts to hydrolyze the metal alkoxide precursors into metal hydroxide precursors. The hydrolysis reaction can be (using TEOS in ethanol solvent as an example): $Si(OC_2H_5)_4 + 4H_2O \rightarrow Si(OH)_4 + 4(C_2H_5OH)$. The resulting hydrolyzed metal hydroxide precursors remain suspended in the solvent solution in a "sol" state, either as individual molecules or as small polymerized (or oligomarized) colloidal clusters of molecules. For example, polymerization/condensation of the $Si(OH)_4$ precursors can occur as follows: $2\ Si(OH)_4 = (OH)_3Si\text{—}O\text{—}Si(OH)_3 + H_2O$. This polymerization can continue until colloidal clusters of polymerized (or oligomarized) $SiO_2$ (silica) molecules are formed.

Acids and bases can be incorporated into the sol-gel solution to control the pH of the solution, and to catalyze the hydrolysis and condensation reactions of the precursor materials. While any acid may be used to catalyze precursor reactions and to obtain a lower pH solution, preferable acids include: HCl, $H_2SO_4$, $H_3PO_4$, oxalic acid and acetic acid. Any base may likewise be used to catalyze precursor reactions and to obtain a higher pH solution, with a preferable base comprising $NH_4OH$.

Strong bases may be used to catalyze precursor reactions and obtain a higher pH solution. The use of a strong base to catalyze precursor reactions can enable the content of hydrophobic inorganic precursor materials, e.g., MTES or DMDES, to be significantly higher than would be possible using a weak base, e.g., a base comprising $NH_4OH$. Within the context of the present disclosure, the term "strong base" refers to both inorganic and organic bases. For example, strong bases according to embodiments herein include cations selected from the group consisting of lithium, calcium, sodium, potassium, rubidium, barium, strontium, and guanidinium. For another example, the basic catalyst used to catalyze precursor reactions can include a catalytic amount of sodium hydroxide, lithium hydroxide, calcium hydroxide, potassium hydroxide, strontium hydroxide, barium hydroxide, guanidine hydroxide, sodium hydroxide, tetrabutylammonium hydroxide, tetramethylammonium hydroxide, choline hydroxide, phosphonium hydroxide, DABCO, DBU, guanidine derivatives, amidines, or phosphazenes.

The sol-gel solution can include additional co-gelling precursors, as well as filler materials and other additives. Filler materials and other additives may be dispensed in the sol-gel solution at any point before or during the formation of a gel. Filler materials and other additives may also be incorporated into the gel material after gelation through various techniques known to those in the art. Preferably, the sol-gel solution comprising the gelling precursors, solvents, catalysts, water, filler materials and other additives is a homogenous solution which is capable of effective gel formation under suitable conditions.

Once a sol-gel solution has been formed and optimized, the gel-forming components in the sol-gel can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques are known to those in the art. Examples include, but are not limited to: maintaining the mixture in a quiescent state for a sufficient period of time; adjusting the pH of the solution; adjusting the temperature of the solution; directing a form of energy onto the mixture (ultraviolet, visible, infrared, microwave, ultrasound, particle radiation, electromagnetic); or a combination thereof.

The process of transitioning gel-forming components into a gel material can also include an aging step (also referred to as curing) prior to liquid phase extraction. Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid phase extraction. Aging can involve: maintaining the gel (prior to extraction) at a quiescent state for an extended period; maintaining the gel at elevated temperatures; adding cross-linkage promoting compounds; or any combination thereof. Preferred temperatures for aging are typically between about 10° C. and about 100° C., though other suitable temperatures are contemplated herein as well. The aging of a gel material typically continues up to the liquid phase extraction of the wet-gel material.

The time period for transitioning gel-forming materials into a gel material includes both the duration of the initial gel formation (from initiation of gelation up to the gel point), as well as the duration of any subsequent curing and aging of the gel material prior to liquid phase extraction (from the gel point up to the initiation of liquid phase extraction). The total time period for transitioning gel-forming materials into a gel material is typically between about 1 minute and several days, preferably about 30 hours or less, about 24 hours or less, about 15 hours or less, about 10 hours or less, about 6 hours or less, about 4 hours or less, about 2 hours or less, about 1 hour or less, about 30 minutes or less, or about 15 minutes or less.

The resulting gel material may be washed in a suitable secondary solvent to replace the primary reaction solvent present in the wet-gel. Such secondary solvents may be linear monohydric alcohols with 1 or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers or their derivative.

Once a gel material has been formed and processed, the liquid phase of the gel can then be at least partially extracted from the wet-gel using extraction methods, including innovative processing and extraction techniques, to form an aerogel material. Liquid phase extraction, among other factors, plays an important role in engineering the characteristics of aerogels, such as porosity and density, as well as related properties such as thermal conductivity. Generally, aerogels are obtained when a liquid phase is extracted from a gel in a manner that causes low shrinkage to the porous network and framework of the wet gel.

Aerogels are commonly formed by removing the liquid mobile phase from the gel material at a temperature and pressure near or above the critical point of the liquid mobile phase. Once the critical point is reached (near critical) or surpassed (supercritical) (i.e., pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, capillary forces generated by liquid evaporation can cause shrinkage and pore collapse within the gel material. Maintaining the mobile phase near or above the critical pressure and temperature during the solvent extraction process reduces the negative effects of such capillary forces. In certain embodiments of the present disclosure, the use of near-critical conditions just below the critical point of the solvent system may allow production of aerogel materials or compositions with sufficiently low shrinkage, thus producing a commercially viable end-product.

Several additional aerogel extraction techniques are known in the art, including a range of different approaches in the use of supercritical fluids in drying aerogels. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been preheated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically extracting the fluid/sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

One embodiment of extracting a liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber.

One example of an alternative method of forming an aerogel includes the acidification of basic metal oxide precursors (such as sodium silicate) in water to make a hydrogel. Salt by-products may be removed from the silicic acid precursor by ion-exchange and/or by washing subsequently formed gels with water. Removing the water from the pores of the gel can be performed via exchange with a polar organic solvent such as ethanol, methanol, or acetone. The liquid phase in the gel is then at least partially extracted using innovative processing and extraction techniques.

Another example of an alternative method of forming aerogels includes reducing the damaging capillary pressure forces at the solvent/pore interface by chemical modification of the matrix materials in their wet gel state via conversion of surface hydroxyl groups to hydrophobic trimethylsilylethers, thereby allowing for liquid phase extraction from the gel materials at temperatures and pressures below the critical point of the solvent.

In yet another embodiment, liquid (solvent) in the gel material may be frozen at lower temperatures followed by a sublimation process whereby the solvent is removed from the gel material. Such removal or drying of the solvent from the gel material is understood to be within the scope of this disclosure. Such removal largely preserves the gel structure, thus producing an aerogel with unique properties.

Large-scale production of aerogel materials or compositions can be complicated by difficulties related to the continuous formation of gel materials on a large scale; as well as the difficulties related to liquid phase extraction from gel materials in large volumes using innovative processing and extraction techniques. Aerogel materials or compositions of the present disclosure are preferably accommodating to production on a large scale. In certain embodiments, gel materials of the present disclosure can be produced in large scale through a continuous casting and gelation process. In certain embodiments, aerogel materials or compositions of the present disclosure are produced in a large scale which requires the use of large scale extraction vessels. Large scale extraction vessels of the present disclosure can include extraction vessels which have a volume of about 0.1 $m^3$ or more, about 0.25 $m^3$ or more, about 0.5 $m^3$ or more, or about 0.75 $m^3$ or more.

Aerogel compositions of the present disclosure can have a thickness of 15 mm or less, 10 mm or less, 5 mm or less, 3 mm or less, 2 mm or less, or 1 mm or less.

Aerogel compositions may be reinforced with various reinforcement materials to achieve a more flexible, resilient and conformable composite product. The reinforcement materials can be added to the gels at any point in the gelling process to produce a wet, reinforced gel composition. The wet gel composition may then be dried to produce a reinforced aerogel composition.

Aerogel compositions may be OCMF-reinforced with various open-celled macroporous framework reinforcement materials to achieve a more flexible, resilient and conformable composite product. The OCMF reinforcement materials can be added to the gels at any point in the gelling process before gelation to produce a wet, reinforced gel composition. The wet gel composition may then be dried to produce an OCMF-reinforced aerogel composition. OCMF reinforcement materials can be formed from organic polymeric materials such as melamine or melamine derivatives, and are present in the form of a continuous sheet or panel.

Melamine OCMF materials can be produced from melamine-formaldehyde precondensation solution. An aqueous solution of a melamine-formaldehyde condensation product is produced by combining a melamine-formaldehyde precondensate with a solvent, an emulsifier/dispersant, a curing agent such as an acid, and a blowing agent such as a C5 to C7 hydrocarbon. The melamine-formaldehyde solution or resin is then cured at elevated temperature above the boiling point of the blowing agent to produce an OCMF comprising a multiplicity of interconnected, three-dimensionally branched melamine structures, with a corresponding network of interconnected pores integrated within the framework. The melamine-formaldehyde precondensates generally have a molar ratio of formaldehyde to melamine in the range from 5:1 to 1.3:1 and typically in the range from 3.5:1 to 1.5:1. The precondensates can be in the form of a powder, a spray, a resin, or a solution. The solvent included in the melamine-formaldehyde precondensation solution can comprise alcohols such as methanol, ethanol, or butanol.

The emulsifier/dispersant included in the melamine-formaldehyde precondensation solution can comprise an anionic surfactant, a cationic emulsifier, or a nonionic surfactant. Useful anionic surfactants include, but are not limited to diphenylene oxide sulfonates, alkane- and alkylbenzenesulfonates, alkylnaphthalenesulfonates, olefinsulfonates, alkyl ether sulfonates, fatty alcohol sulfates, ether sulfates, α-sulfo fatty acid esters, acylaminoalkanesulfonates, acyl isethionates, alkyl ether carboxylates, N-acylsarcosinates, alkyl, and alkylether phosphates. Useful cationic emulsifiers include, but are not limited to alkyltriammonium salts, alkylbenzyl dimethylammonium salts, or alkylpyridinium salts. Useful nonionic surfactants include, but are not limited to alkylphenol polyglycol ethers, fatty alcohol polyglycol ethers, fatty acid polyglycol ethers, fatty acid alkanolamides, ethylene oxide-propylene oxide block copolymers, amine oxides, glycerol fatty acid esters, sorbitan esters, and alkylpolyglycosides. The emulsifier/dispersant can be added in amounts from 0.2% to 5% by weight, based on the melamine-formaldehyde precondensate.

The curing agent included in the melamine-formaldehyde precondensation solution can comprise acidic compounds. The amount of these curatives is generally in the range from 0.01% to 20% by weight and typically in the range from 0.05% to 5% by weight, all based on the melamine-formaldehyde precondensate. Useful acidic compounds include, but are not limited to organic and inorganic acids, for example selected from the group consisting of hydrochloric acid, sulfuric acid, phosphoric acid, nitric acid, formic acid, acetic acid, oxalic acid, toluenesulfonic acids, amidosulfonic acids, acid anhydrides, and mixtures thereof.

The blowing agent included in the melamine-formaldehyde precondensation solution can comprise physical blowing agents or chemical blowing agents. Useful physical blowing agents include, but are not limited to hydrocarbons, such as pentane and hexane; halogenated hydrocarbons, more particularly chlorinated and/or fluorinated hydrocarbons, for example methylene chloride, chloroform, trichloroethane, chlorofluorocarbons, and hydro-chlorofluorocarbons (HCFCs); alcohols, for example methanol, ethanol, n-propanol or isopropanol; ethers, ketones and esters, for example methyl formate, ethyl formate, methyl acetate or ethyl acetate; and gases, such as air, nitrogen or carbon dioxide. In certain embodiments, it is preferable to add a physical blowing agent having a boiling point between 0° C. and 80° C. Useful chemical blowing agents include, but are not limited to, isocyanates mixed with water (releasing carbon dioxide as active blowing agent); carbonates and/or bicarbonates mixed with acids (releasing carbon dioxide as active blowing agent); and azo compounds, for example azodicarbonamide. The blowing agent is present in the melamine-formaldehyde precondensation solution in an amount of 0.5% to 60% by weight, particularly 1% to 40% by weight and in certain embodiments 1.5% to 30% by weight, based on the melamine-formaldehyde precondensate.

The melamine-formaldehyde precondensation solution can be formed into a melamine OCMF material by heating the solution to a temperature generally above the boiling point of the blowing agent used, thereby forming an OCMF comprising a multiplicity of interconnected, three-dimensionally branched melamine structures, with a corresponding network of interconnected open-cell pores integrated within the framework. The introduction of heat energy may be effected via electromagnetic radiation, for example via high-frequency radiation at 5 to 400 kW, for example 5 to 200 kW and in certain embodiments 9 to 120 kW per kilogram of the mixture used in a frequency range from 0.2 to 100 GHz, or more specifically 0.5 to 10 GHz. Magnetrons are a useful source of dielectric radiation, and one magnetron can be used or two or more magnetrons at the same time.

The OCMF material can be dried to remove residual liquids (water, solvent, blowing agent) from the OCMF material. An after-treatment can also be utilized to hydrophobicize the OCMF material. This after-treatment can employ hydrophobic coating agents having high thermal stability and/or low flammability, for example silicones, siliconates or fluorinated compounds.

The density of the melamine OCMF is generally in the range from 0.005 to 0.3 g/cc, for example in the range from 0.01 to 0.2 g/cc, in certain embodiments in the range from 0.03 to 0.15 g/cc, or most specifically in the range from 0.05 to 0.15 g/cc. The average pore diameter of the melamine OCMF is generally in the range of 10 μm to about 1000 particularly in the range from 50 to 700 μm.

In an embodiment, OCMF reinforcement materials are incorporated into the aerogel composition as continuous sheet. The process comprises initially producing a continuous sheet of OCMF-reinforced gel by casting or impregnating a gel precursor solution into a continuous sheet of OCMF reinforcement material, and allowing the material to form into a reinforced gel composite sheet. The liquid may then be at least partially extracted from the OCMF-reinforced gel composite sheet to produce a sheet-like, OCMF-reinforced aerogel composition.

Aerogel compositions can include an opacifier to reduce the radiative component of heat transfer. At any point prior to gel formation, opacifying compounds or precursors thereof may be dispersed into the mixture comprising gel precursors. Examples of opacifying compounds include, but are not limited to Boron Carbide (B4C), Diatomite, Manganese ferrite, MnO, NiO, SnO, Ag2O, Bi2O3, carbon black, titanium oxide, iron titanium oxide, aluminum oxide, zirconium silicate, zirconium oxide, iron (II) oxide, iron (III) oxide, manganese dioxide, iron titanium oxide (ilmenite), chromium oxide, carbides (such as SiC, TiC or WC), or mixtures thereof. Examples of opacifying compound precursors include, but are not limited to TiOSO4 or TiOCl2.

Aerogel compositions can include one or more fire-class additives. Within the context of the present disclosure, the term "fire-class additive" refers to a material that has an endothermic effect in the context of reaction to fire and can be incorporated into an aerogel composition. Furthermore, in certain embodiments, fire-class additives have an onset of endothermic decomposition (ED) that is no more than 100° C. greater than the onset of thermal decomposition (Ta) of the aerogel composition in which the fire-class additive is present, and in certain embodiments, also an ED that is no more than 50° C. lower than the $T_d$ of the aerogel composition in which the fire-class additive is present. In other words, the ED of fire-class additives has a range of ($T_d$–50° C.) to ($T_d$+100° C.):

$$E_D \begin{cases} \max: T_d + 100° \text{ C.} \\ \min: T_d - 50° \text{ C.} \end{cases}$$

Prior to, concurrent with, or even subsequent to incorporation or mixing with the sol (e.g., silica sol prepared from alkyl silicates or water glass in various ways as understood in prior art), fire-class additives can be mixed with or otherwise dispersed into a medium including ethanol and optionally up to 10% vol. water. The mixture may be mixed and/or agitated as necessary to achieve a substantially uniform dispersion of additives in the medium. Without being bound by theory, utilizing a hydrated form of the above-referenced clays and other fire-class additives provides an additional endothermic effect. For example, halloysite clay (commercially available under the tradename DRAGONITE from Applied Minerals, Inc. or from Imerys simply as Halloysite) and kaolinite clay, which are aluminum silicate clays that in hydrated form have an endothermic effect by releasing water of hydration at elevated temperatures. As another example, carbonates in hydrated form can release carbon dioxide on heating or at elevated temperatures.

Within the context of the present disclosure, the terms "heat of dehydration" means the amount of heat required to vaporize the water (and dihydroxylation, if applicable) from the material that is in hydrated form when not exposed to elevated temperatures. Heat of dehydration is typically expressed on a unit weight basis.

In certain embodiments, fire-class additives of the present disclosure have an onset of thermal decomposition of about 350° C. or more, about 400° C. or more, about 450° C. or more, about 500° C. or more, about 550° C. or more, about 600° C. or more, about 650° C. or more, about 700° C. or more, about 750° C. or more, about 800° C. or more, or in a range between any two of these values. In certain embodiments, fire-class additives of the present disclosure have an onset of thermal decomposition of about 440° C. or 570° C. In certain embodiments, fire-class additives of the present disclosure have an onset of thermal decomposition which is no more than 50° C. more or less than the Td of the aerogel composition (without the fire-class additive) into which the fire-class additive is incorporated, no more than 40° C. more or less, no more than 30° C. more or less, no more than 20° C. more or less, no more than 10° C. more or less, no more than 5° C. more or less, or in a range between any two of these values The fire-class additives of this disclosure include, clay materials such as, but not limited to, phyllosilicate clays (such as illite), kaolinite (aluminum silicate; Al2Si2O5(OH) 4), halloysite (aluminum silicate; Al2Si2O5(OH)4)), endellite (aluminum silicate; Al₂Si2O5(OH)4), mica (silica minerals), diaspore, gibbsite (aluminum hydroxide), montmorillonite, beidellite, pyrophyllite (aluminum silicate; Al2Si4O10(OH)2), nontronite, bravaisite, smectite, leverrierite, rectorite, celadonite, attapulgite, chloropal, volkonskoite, allophane, racewinite, dillnite, severite, miloschite, collyrite, cimolite and newtonite, magnesium hydroxide (or magnesium dihydroxide, "MDH"), alumina trihydrate ("ATH"), carbonates such as, but not limited to, dolomite and lithium carbonate. Among the clay materials, certain embodiments of the present disclosure use clay materials that have at least a partial layered structure. In certain embodiments of the present disclosure, clay materials as fire-class additives in the aerogel compositions have at least some water such as in hydrated form. The additives may be in hydrated crystalline form or may become hydrated in the manufacturing/processing of the compositions of the present invention. In certain embodiments, fire-class additives also include low melting additives that absorb heat without a change in chemical composition. An example of this class is a low melting glass, such as inert glass beads.

In certain embodiments of the present disclosure, clay materials e.g., aluminosilicate clays such as halloysite or kaolinite, as additives in the aerogel compositions are in the dehydrated form, e.g., meta-halloysite or metakaolin. Other additives that may be useful in the compositions of the present disclosure include, but are not limited to, wollastonite (calcium silicate) and titanium dioxide (TiO2). In certain embodiments, other additives may include infrared opacifiers such as, but not limited to, titanium dioxide or silicon carbide, ceramifiers such as, but not limited to, low melting glass frit, calcium silicate or charformers such as, but not limited to, phosphates and sulfates. In certain embodiments, additives may require special processing considerations such as techniques to ensure the additives are uniformly distributed and not agglomerated heavily to cause product performance variations. The processing techniques may involve additional static and dynamic mixers, stabilizers, adjustment of process conditions and others known in the art. The amount of additives in the final aerogel compositions may depend on various other property requirements and may vary from 0.1% to about 70% by weight. In certain embodiments, the amount of additives in the final aerogel composition is between 10 and 60 wt % and in certain preferred embodiments, it is between 20 and 40 wt %. In certain embodiments, the additives may be of more than one type. In certain embodiments, the amount of additives in the final aerogel composition is in the range of about 0.1 wt % to about 10 wt % relative to the silica content of the aerogel. For example, the additive or additives can be present in a range of about 0.5 wt % to about 3.0 wt % relative to the silica content of the aerogel. One or more fire-class additives may also be present in the final aerogel compositions.

In certain embodiments, the inclusion of additives, e.g., aluminosilicate clay-based materials such as halloysite or kaolin, in the aerogel materials and compositions of the present disclosure can provide improved high temperature shrinkage properties. An exemplary test method for high temperature shrinkage is "Standard Test Method for Linear Shrinkage of Preformed High-Temperature Thermal Insulation Subjected to Soaking Heat" (ASTM C356, ASTM International, West Conshohocken, Pa.). In such tests, referred to as a "thermal soak," materials are exposed to temperatures greater than 1000° C. for a duration of up to 60 minutes. In certain exemplary embodiments, aerogel materials or compositions of the present disclosure can have high temperature shrinkage, i.e., a linear shrinkage, width shrinkage, thickness shrinkage or any combination of dimensional shrinkage, of about 20% or less, about 15% or less, about 10% or less, about 6% or less, about 5% or less, 4% or less, 3% or less, 2% or less, 1% or less, or in a range between any two of these values.

In some exemplary embodiments, certain basic catalysts used to catalyze precursor reactions can result in trace levels of alkali metals in the aerogel composition. Trace levels, e.g., 100 to 500 ppm, of alkali, e.g., sodium or potassium, in the aerogel materials can have a deleterious effect on high temperature shrinkage and thermal durability. However, without being bound by any particular mechanism or theory, aluminosilicate clay-based materials such as halloysite or kaolin can sequester fugitive alkali, e.g., sodium or potassium, thereby reducing or eliminating the effect of alkali on shrinkage and thermal durability. In certain embodiments of the present disclosure, the aluminosilicate clay materials are in the dehydrated form, e.g., meta-halloysite or metakaolin. For example, aerogel materials or compositions including an amount of metakaolin or meta-halloysite of greater than about 0.5 wt % can significantly reduce thermal shrinkage and improve thermal durability. In exemplary embodiments, aerogel materials or compositions can include an amount of metakaolin or meta-halloysite in a range of about 0.5 wt % to about 3.0 wt %. In certain embodiments, aerogel materials or compositions can include an amount of metakaolin of greater than about 0.5 wt %, for example an amount of metakaolin in a range of about 0.5 wt % to about 3.0 wt %. In preferred embodiments, the aerogel materials or compositions can include an amount of metakaolin in the above referenced ranges relative to the silica content of the aerogel.

In certain embodiments of the present disclosure, methods are provided to prepare OCMF reinforced aerogel compositions with fire-class performance. The fire-class compositions of these embodiments also possess hydrophobicity sufficient for use as thermal insulation in industrial environments, as measured by water uptake and low thermal conductivity to help meet the ever-demanding energy conservation needs. To obtain these combinations of desirable properties, simply loading additives or even fire-class additives are not successful. While one can try various permutations and combinations or various additives and arrive at an optimized solution, such efforts are not always successful and present risks for a viable manufacturing with repeatable quality control on these desired properties. An important aspect of these embodiments is to assess the thermal behavior (assessed through thermogravimetry or differential scanning calorimetry) of the composition that would otherwise provide all desirable properties except for the fire performance and consider a fire-class additive that closely matches the onset of thermal decomposition of the underlying composition or alternatively, the temperature at which most heat is emitted with the fire-class additives' onset of thermal decomposition or the temperature at which most heat is absorbed.

In certain embodiments, the desired fire properties of the final composition may include not just the inherent property such as heat of combustion (ISO 1716), but also system fire properties such as reaction to fire performance as per ISO 1182. In the case of ISO 1182, weight loss, increase in furnace temperature, and flame time are assessed when exposed to a furnace at a temperature of about 750° C.

An OCMF reinforced aerogel composition may have various components that add fuel to the system. Additionally, it may have various other components, while not contributing as fuel, may interfere in combustion upon exposure to fire. As such, combustion behavior of such systems cannot be predicted simply based on the constituent elements. In situations where a multitude of properties are desired, in certain embodiments, the composition should be arrived at without regard to its fire property and such arrived composition's thermal performance should be assessed to find a suitable fire-class additive that will provide the fire property without compromising the other properties the starting composition was intended to provide.

In certain embodiments, onset of thermal decomposition is a critical property of the composition. In certain other embodiments, the temperature at which the peak heat release may be a critical property for the purposes of developing an enhanced fire-performing aerogel OCMF compositions. When multiple fuel components are present in the composition identified by multiple peaks in the DSC curve, such compositions are well served by matching the temperature of the peak heat release of the OCMF reinforced aerogel composition with a fire-class additive having a temperature of endothermic peak heat release within 140° C., 120° C., 100° C. or 80° C. In many embodiments, the temperature of endothermic peak heat release is within 50° C.

The dry aerogel material or composition can be further processed to optimize target properties of the aerogel material or composition. In certain embodiments, dried aerogel compositions can be subjected to one or more heat treatments, such as pyrolysis, to produce a heat treated aerogel composition. Carefully controlled heat treatment can be used to reduce or stabilize the hydrocarbon fuel content of an aerogel material or composition, which can improve corresponding HOC and $T_d$ properties of the aerogel material or composition. In certain embodiments, the heat treatment of a dried aerogel composition can take place under a range of temperatures, pressures, durations, and atmospheric conditions.

In certain embodiments of the present disclosure, a dried aerogel composition can be subjected to a treatment temperature no greater than about 225° C. The heat treatment can remove volatile components present in the composition, e.g., ethanol and water. In certain embodiments of the present disclosure, a dried aerogel composition can be subjected to a treatment temperature no greater than about 450° C. In certain embodiments of the present disclosure, a dried aerogel composition can be subjected to a treatment temperature no greater than about 625° C. In certain embodiments of the present disclosure, a dried aerogel composition can be subjected to a treatment temperature no greater than about 650° C. In some embodiments of the present disclosure, a dried aerogel composition can be subjected to a treatment temperature of 200° C. or above, 250° C. or above, 300° C. or above, 350° C. or above, 400° C. or above, 450° C. or above, 500° C. or above, 550° C. or above, 600° C. or above, 625° C. or above, 650° C. or above, 700° C. or above, 750° C. or above, 800° C. or above, or in a range between any two of these values. In certain embodiments of the present disclosure, the heat treatment of the aerogel material or composition of the present disclosure is limited to temperature exposures below 950° C., below 900° C., below 850° C., below 800° C., below 750° C., below 700° C., below 650° C., or below 600° C. In certain embodiments, the present disclosure provides aerogel materials, compositions and processing methods which allow for controlled heat treatment to reduce or stabilize the hydrocarbon fuel content of the aerogel material (thereby improving corresponding properties of the aerogel material such as HOC and $T_d$); and which also allow for the aerogel material to maintain functional levels of hydrophobicity at high temperatures, including exposures to temperatures of about 550° C. or more, and exposures to temperatures of about 650° C. or more.

In certain embodiments of the present disclosure, a dried aerogel composition can be subjected to one or more heat treatments for a duration of time of 3 hours or more, between 10 seconds and 3 hours, between 10 seconds and 2 hours, between 10 seconds and 1 hour, between 10 seconds and 45 minutes, between 10 seconds and 30 minutes, between 10 seconds and 15 minutes, between 10 seconds and 5 minutes, between 10 seconds and 1 minute, between 1 minute and 3 hours, between 1 minute and 1 hour, between 1 minute and 45 minutes, between 1 minute and 30 minutes, between 1 minute and 15 minutes, between 1 minute and 5 minutes, between 10 minutes and 3 hours, between 10 minutes and 1 hour, between 10 minutes and 45 minutes, between 10 minutes and 30 minutes, between 10 minutes and 15 minutes, between 30 minutes and 3 hours, between 30 minutes and 1 hour, between 30 minutes and 45 minutes, between 45 minutes and 3 hours, between 45 minutes and 90 minutes, between 45 minutes and 60 minutes, between 1 hour and 3 hours, between 1 hour and 2 hours, between 1 hour and 90 minutes, or in a range between any two of these values.

In certain embodiments of the present disclosure, a dried aerogel composition can be subjected to a treatment temperature between 200° C. and 750° C. for a duration of time between 10 seconds and 3 hours.

The heat treatment of the aerogel material or composition can take place in a reduced oxygen environment. Within the context of the present disclosure, the term "reduced oxygen environment" refers to an atmosphere which comprises a concentration by volume of 10 vol % oxygen or less (which is below the amount of oxygen in ambient air at standard conditions). A reduced oxygen environment can comprise positive pressurized atmospheres which have elevated concentrations of inert gases, including (but not limited to) nitrogen, argon, helium, neon, argon, and xenon. A reduced oxygen environment can also comprise vacuum atmospheres which have reduced concentrations of oxygen, including vacuums and partial vacuums. A reduced oxygen environment can further include atmospheres contained in a sealed container in which limited combustion has consumed a portion of the oxygen content in the sealed atmosphere. A reduced oxygen environment can comprise 10 vol % oxygen or less, 8 vol % oxygen or less, 6 vol % oxygen or less, 5 vol % oxygen or less, 4 vol % oxygen or less, 3 vol % oxygen or less, 2 vol % oxygen or less, or 1 vol % oxygen or less. A reduced oxygen environment can comprise between 0.1 to 10 vol % oxygen, between 0.1 to 5 vol % oxygen, between 0.1 to 3 vol % oxygen, between 0.1 to 2 vol % oxygen, or between 0.1 to 1 vol % oxygen. In certain embodiments of the present disclosure, a hydrophobic aerogel material or composition is heat treated in a reduced oxygen atmosphere comprising between about 85% to about 99.9% inert gas (such as nitrogen). In a preferred embodiment of the present disclosure, a dried hydrophobic aerogel composition is heat treated in a reduced oxygen atmosphere comprising between about 95% to about 99.9% inert gas (such as nitrogen) at a temperature between about 200° C. and about 800° C. for a duration of time between about 1 minute and about 3 hours.

The embodiments of the present disclosure can be practiced using any of the processing, extraction and treatment techniques discussed herein, as well as other processing, extraction and treatment techniques known to those in the art for producing aerogels, aerogel-like materials, and aerogel compositions as defined herein.

Aerogel compositions may be fiber-reinforced with various fiber reinforcement materials to achieve a more flexible, resilient and conformable composite product. The fiber reinforcement materials can be added to the gels at any point in the gelling process to produce a wet, fibrous gel composition. The wet gel composition may then be dried to produce a fiber-reinforced aerogel composition. Fiber reinforcement materials may be in the form of discrete fibers, woven materials, non-woven materials, battings, webs, mats, and felts. Fiber reinforcements can be made from organic fibrous materials, inorganic fibrous materials, or combinations thereof.

In a preferred embodiment, non-woven fiber reinforcement materials are incorporated into the aerogel composition as continuous sheet of interconnected or interlaced fiber reinforcement materials. The process comprises initially producing a continuous sheet of fiber reinforced gel by casting or impregnating a gel precursor solution into a continuous sheet of interconnected or interlaced fiber reinforcement materials. The liquid phase may then be at least partially extracted from the fiber-reinforced gel sheets to produce a sheet-like, fiber reinforced aerogel composition.

Aerogel composition can also include an opacifier to reduce the radiative component of heat transfer. At any point prior to gel formation, opacifying compounds or precursors thereof may be dispersed into the mixture comprising gel precursors. Examples of opacifying compounds include, but are not limited to: Boron Carbide [$B_4C$], Diatomite, Manganese ferrite, MnO, NiO, SnO, $Ag_2O$, $Bi_2O_3$, carbon black, titanium oxide, iron titanium oxide, aluminum oxide, zirconium silicate, zirconium oxide, iron (II) oxide, iron (III) oxide, manganese dioxide, iron titanium oxide (ilmenite), chromium oxide, carbides (such as SiC, TiC or WC), or mixtures thereof. Examples of opacifying compound precursors include, but are not limited to: $TiOSO_4$ or $TiOCl_2$.

The aerogel materials and compositions of the present disclosure have been shown to be highly effective as insulation materials. However, application of the methods and materials of the present disclosure are not intended to be limited to applications related to insulation. The methods and materials of the present disclosure can be applied to any system or application which would benefit from the unique combination of properties or procedures provided by the materials and methods of the present disclosure.

The following examples provide various non-limiting embodiments and properties of the present disclosure.

Example 1

Sols of both methyltriethoxysilane and polyethylsilicate are individually prepared via hydrolysis under acidic conditions in ethanol. The ratio and concentration of sol materials are adjusted to obtain a hydrophobe content from MTES of about 32 wt % and to obtain aerogels with about 7.0 wt % organic content within the aerogel material. Metakaolin is incorporated into the combined sol at a weight percentage of at least 0.5% relative to silica content, which is then stirred for no less than 1 hour.

Lithium hydroxide (1.0M) is added to the combined sol at concentration sufficient to target aerogel density of about 0.07-0.085 g/cc. The catalyzed sol containing metakaolin is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc (given a 0.07-0.08 g/cc aerogel density).

Example 2

Sols of both methyltriethoxysilane (MTES) and polyethylsilicate are individually prepared via hydrolysis under acidic conditions in ethanol. The ratio and concentration of sol materials are adjusted to obtain a hydrophobe content from MTES of about 32 wt % and to obtain aerogels with about 7.0 wt % organic content within the aerogel material. Metakaolin is incorporated into the combined sol at a weight percentage of at least 0.5% relative to silica content, which is then stirred for no less than 1 hour.

Guanidine hydroxide (2M) is added to the combined sol at concentration sufficient to target aerogel density of about 0.07-0.085 g/cc. The catalyzed sol containing metakaolin is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc (given a 0.07-0.08 g/cc aerogel density).

Example 3

Sols of both methyltriethoxysilane (MTES) and tetraethoxylsilane (TEOS) were individually prepared via hydrolysis under acidic conditions in ethanol. The ratio and concentration of sol materials were adjusted to obtain a hydrophobe content from MTES of about 36 wt % and to obtain aerogels with about 8.0 wt % organic content within the aerogel material. Metakaolin was incorporated into the combined sol at a weight percentage of at least 0.5% relative to silica content, which is then stirred for no less than 1 hour.

Guanidine hydroxide (2M) was added to the combined sol at concentration sufficient to target aerogel density of about 0.07-0.085 g/cc. The catalyzed sol containing metakaolin was cast into a fiber reinforcing phase and allowed to gel. After curing for no greater than 1 h at room temperature, the aerogel materials were aged for about 10 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous non-woven material comprised of polyester and textile grade glass fibers (E-glass composition), about 10 mm thick with a density of about 1.5 oz/sq ft. The resulting aerogel material was about 65 wt % aerogel and 35 wt % fiber, resulting in an expected material density of about 0.16-0.20 g/cc (given a 0.07-0.08 g/cc aerogel density).

Example 4

Individual sols of both methyltriethoxysilane (MTES) and tetraethoxylsilane (TEOS) are individually prepared via hydrolysis under acidic conditions in ethanol. The ratio and concentration of sol materials are adjusted to obtain a hydrophobe content from MTES of about 36 wt % and to obtain aerogels with about 8.0 wt % organic content within the aerogel material. Metakaolin is incorporated into the combined sol at a weight percentage of at least 0.5% relative to silica content, which is then stirred for no less than 1 hour.

Lithium hydroxide (1.0M) is added to the combined sol at concentration sufficient to target aerogel density of about 0.07-0.085 g/cc. The catalyzed sol containing metakaolin is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc (given a 0.07-0.08 g/cc aerogel density).

Example 5

An individual sol of both methyltriethoxysilane (MTES) and dimethyl diethoxysilane (DIVIDES), and one containing tetraethoxylsilane (TEOS) were independently individually prepared via hydrolysis under acidic conditions in ethanol. The ratio and concentration of sol materials were adjusted to obtain a hydrophobe content from MTES of about 32.4 wt %, a DMDES content of about 3.6 wt %, and a final aerogel with about 8.7 wt % organic content within the aerogel material. Metakaolin was incorporated into the combined sol at about 3.0 wt % relative to silica content, which was then stirred for no less than 1 hour.

Guanidine hydroxide (2M) was added to the combined sol at concentration sufficient to target aerogel density of about 0.0825 g/cc. The catalyzed sol containing was cast into a fiber reinforcing phase and allowed to gel. After curing for no greater than 1 h at room temperature, the aerogel materials was aged for about 10 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous non-woven material comprised of polyester and textile grade glass fibers (E-glass composition), about 10 mm thick with a density of about 1.5 oz/sq ft. The resulting aerogel material was about 65 wt % aerogel and 35 wt % fiber, resulting in an expected material density of about 0.16-0.20 g/cc.

Example 6

An individual sol of both methyltriethoxysilane (MTES) and dimethyl diethoxysilane (DIVIDES), and one containing tetraethoxylsilane (TEOS) are independently prepared via hydrolysis under acidic conditions in ethanol. The ratio and concentration of sol materials are adjusted to obtain a hydrophobe content from MTES of about 32.4 wt %, a DMDES content of about 3.6 wt %, and a final aerogel with about 8.7 wt % organic content within the aerogel material. Metakaolin is incorporated into the combined sol at about 3.0 wt % relative to silica content, which is then stirred for no less than 1 hour.

Lithium hydroxide (1.0M) is added to the combined sol at concentration sufficient to target aerogel density of about 0.0825 g/cc. The catalyzed sol containing metakaolin is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc.

Example 7

An individual sol of both methyltriethoxysilane (MTES) and dimethyl diethoxysilane (DIVIDES), and one containing tetraethoxylsilane (TEOS) were independently prepared via hydrolysis under acidic conditions in ethanol. The ratio and concentration of sol materials were adjusted to obtain a hydrophobe content from MTES of about 32.4 wt %, a DMDES content of about 3.6 wt %, and a final aerogel with about 8.7 wt % organic content within the aerogel material. Metakaolin was incorporated into the combined sol at about 3.0 wt % relative to silica content, which was then stirred for no less than 1 hour.

Guanidine hydroxide (2M) was added to the combined sol at concentration sufficient to target aerogel density of about 0.0825 g/cc. The catalyzed sol containing metakaolin was cast into a fiber reinforcing phase and allowed to gel. After curing for no greater than 1 h at room temperature, the aerogel materials were aged for about 10 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous non-woven material comprised of polyester and textile grade glass fibers (E-glass composition), about 10 mm thick with a density of about 1.5 oz/sq ft. The resulting aerogel material was about 65 wt % aerogel and 35 wt % fiber, resulting in an expected material density of about 0.16-0.20 g/cc.

Example 8

An individual sol of both methyltriethoxysilane (MTES) and dimethyl diethoxysilane (DIVIDES), and one containing tetraethoxylsilane (TEOS) are independently prepared via hydrolysis under acidic conditions in ethanol. The ratio and concentration of sol materials are adjusted to obtain a hydrophobe content from MTES of about 32.4 wt %, a DMDES content of about 3.6 wt %, and a final aerogel with about 8.7 wt % organic content within the aerogel material. Metakaolin is incorporated into the combined sol at about 3.0 wt % relative to silica content, which is then stirred for no less than 1 hour.

Lithium hydroxide (1.0M) is added to the combined sol at concentration sufficient to target aerogel density of about 0.0825 g/cc. The catalyzed sol containing metakaolin is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc.

Example 9

An individual sol of both methyltriethoxysilane (MTES) and dimethyl diethoxysilane (DIVIDES), and one containing tetraethoxylsilane (TEOS) are independently prepared via hydrolysis under acidic conditions in ethanol. The ratio and concentration of sol materials are adjusted to obtain a hydrophobe content from MTES of about 28.8 wt %, a DMDES content of about 7.2 wt %, and a final aerogel with about 9.3 wt % organic content within the aerogel material. Metakaolin is incorporated into the combined sol at about 3.0 wt % relative to silica content, which is then stirred for no less than 1 hour.

Guanidine hydroxide (2M) is added to the combined sol at concentration sufficient to target aerogel density of about 0.0825 g/cc. The catalyzed sol containing metakaolin is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc.

Example 10

An individual sol of both methyltriethoxysilane (MTES) and dimethyl diethoxysilane (DIVIDES), and one containing tetraethoxylsilane (TEOS) are independently prepared via hydrolysis under acidic conditions in ethanol. The ratio and concentration of sol materials are adjusted to obtain a hydrophobe content from MTES of about 28.8 wt %, a DMDES content of about 7.2 wt %, and a final aerogel with about 9.3 wt % organic content within the aerogel material. Metakaolin is incorporated into the combined sol at about 3.0 wt % relative to silica content, which is then stirred for no less than 1 hour.

Lithium hydroxide (1.0M) is added to the combined sol at concentration sufficient to target aerogel density of about 0.0825 g/cc. The catalyzed sol containing metakaolin is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc.

Example 11

Sols of both methyltriethoxysilane and polyethylsilicate were individually prepared via hydrolysis under acidic conditions in ethanol. These sols were combined at a specific relative ratio and utilized at a specific concentration in order to obtain aerogels with about 7.0 wt % organic content within the aerogel material. Halloysite clay, e.g., Dragonite™ was incorporated into the combined sol at a weight percentage of at least 0.5% relative to silica content, which is then stirred for no less than 1 hour.

Lithium hydroxide (1.0M) was added to the combined sol at concentration sufficient to target aerogel density of about 0.07-0.085 g/cc. The catalyzed sol containing halloysite clay was cast into a fiber reinforcing phase and allowed to gel. After curing for no greater than 1 h at room temperature, the aerogel materials were aged for about 10 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous non-woven material comprised of polyester and textile grade glass fibers (E-glass composition), about 10 mm thick with a density of about 1.5 oz/sq ft. The resulting aerogel material was about 65 wt % aerogel and 35 wt % fiber, resulting in an expected material density of about 0.16-0.20 g/cc (given a 0.07-0.08 g/cc aerogel density).

Example 12

Sols of both methyltriethoxysilane (MTES) and polyethylsilicate are individually prepared via hydrolysis under acidic conditions in ethanol. These sols are combined at a specific relative ratio and utilized at a specific concentration in order to obtain aerogels with about 7.0 wt % organic content within the aerogel material. Halloysite clay, e.g., Dragonite™ is incorporated into the combined sol at a weight percentage of at least 0.5% relative to silica content, which is then stirred for no less than 1 hour.

Guanidine hydroxide (2M) is added to the combined sol at concentration sufficient to target aerogel density of about 0.07-0.085 g/cc. The catalyzed sol containing halloysite clay is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc (given a 0.07-0.08 g/cc aerogel density).

Example 13

Sols of both methyltriethoxysilane (MTES) and tetraethoxylsilane (TEOS) are individually prepared via hydrolysis under acidic conditions in ethanol. The ratio and concentration of sol materials were adjusted to obtain a hydrophobe content from MTES of about 36 wt % and to obtain aerogels with about 8.0 wt % organic content within the aerogel material. Halloysite clay, e.g., Dragonite™ is incorporated into the combined sol at a weight percentage of at least 0.5% relative to silica content, which is then stirred for no less than 1 hour.

Guanidine hydroxide (2M) is added to the combined sol at concentration sufficient to target aerogel density of about 0.07-0.085 g/cc. The catalyzed sol containing halloysite is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc (given a 0.07-0.08 g/cc aerogel density).

Example 14

Individual sols of both methyltriethoxysilane (MTES) and tetraethoxylsilane (TEOS) were individually prepared via hydrolysis under acidic conditions in ethanol. The ratio and concentration of sol materials were adjusted to obtain a hydrophobe content from MTES of about 36 wt % and to obtain aerogels with about 8.0 wt % organic content within the aerogel material. Halloysite clay, e.g., Dragonite™ was incorporated into the combined sol at a weight percentage of at least 0.5% relative to silica content, which was then stirred for no less than 1 hour.

Lithium hydroxide (1.0M) was added to the combined sol at concentration sufficient to target aerogel density of about 0.07-0.085 g/cc. The catalyzed sol containing halloysite was cast into a fiber reinforcing phase and allowed to gel. After curing for no greater than 1 h at room temperature, the aerogel materials were aged for about 10 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous non-woven material comprised of polyester and textile grade glass fibers (E-glass composition), about 10 mm thick with a density of about 1.5 oz/sq ft. The resulting aerogel material was about 65 wt % aerogel and 35 wt % fiber, resulting in an expected material density of about 0.16-0.20 g/cc (given a 0.07-0.08 g/cc aerogel density).

Example 15

An individual sol of both methyltriethoxysilane (MTES) and dimethyl diethoxysilane (DIVIDES), and one containing tetraethoxylsilane (TEOS) were independently prepared via hydrolysis under acidic conditions in ethanol. The ratio and concentration of sol materials were adjusted to obtain a hydrophobe content from MTES of about 32.4 wt %, a DMDES content of about 3.6 wt %, and a final aerogel with about 8.7 wt % organic content within the aerogel material. Halloysite clay, e.g., Dragonite™ was incorporated into the combined sol at about 3.0 wt % relative to silica content, which was then stirred for no less than 1 hour.

Guanidine hydroxide (2M) was added to the combined sol at concentration sufficient to target aerogel density of about 0.0825 g/cc. The catalyzed sol containing halloysite was cast into a fiber reinforcing phase and allowed to gel. After curing for no greater than 1 h at room temperature, the aerogel materials were aged for about 10 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous non-woven material comprised of polyester and textile grade glass fibers (E-glass composition), about 10 mm thick with a density of about 1.5 oz/sq ft. The resulting aerogel material was about 65 wt % aerogel and 35 wt % fiber, resulting in an expected material density of about 0.16-0.20 g/cc.

Example 16

An individual sol of both methyltriethoxysilane (MTES) and dimethyl diethoxysilane (DIVIDES), and one containing tetraethoxylsilane (TEOS) were independently prepared via hydrolysis under acidic conditions in ethanol. The ratio and concentration of sol materials were adjusted to obtain a hydrophobe content from MTES of about 32.4 wt %, a DMDES content of about 3.6 wt %, and a final aerogel with about 8.7 wt % organic content within the aerogel material. Halloysite clay, e.g., Dragonite™ was incorporated into the combined sol at about 3.0 wt % relative to silica content, which is then stirred for no less than 1 hour.

Lithium hydroxide (1.0M) was added to the combined sol at concentration sufficient to target aerogel density of about 0.0825 g/cc. The catalyzed sol containing halloysite was cast into a fiber reinforcing phase and allowed to gel. After curing for no greater than 1 h at room temperature, the aerogel materials were aged for about 10 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous non-woven material comprised of polyester and textile grade glass fibers (E-glass composition), about 10 mm thick with a density of about 1.5 oz/sq ft. The resulting aerogel material was about 65 wt % aerogel and 35 wt % fiber, resulting in an expected material density of about 0.16-0.20 g/cc.

Example 17

An individual sol of both methyltriethoxysilane (MTES) and dimethyl diethoxysilane (DIVIDES), and one containing tetraethoxylsilane (TEOS) are independently prepared via hydrolysis under acidic conditions in ethanol. The ratio and concentration of sol materials are adjusted to obtain a hydrophobe content from MTES of about 32.4 wt %, a DMDES content of about 3.6 wt %, and a final aerogel with about 8.7 wt % organic content within the aerogel material. Halloysite clay, e.g., Dragonite™ is incorporated into the combined sol at about 3.0 wt % relative to silica content, which is then stirred for no less than 1 hour.

Guanidine hydroxide (2M) is added to the combined sol at concentration sufficient to target aerogel density of about 0.0825 g/cc. The catalyzed sol containing halloysite is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc.

Example 18

An individual sol of both methyltriethoxysilane (MTES) and dimethyl diethoxysilane (DIVIDES), and one containing tetraethoxylsilane (TEOS) were independently prepared via hydrolysis under acidic conditions in ethanol. The ratio and concentration of sol materials were adjusted to obtain a hydrophobe content from MTES of about 32.4 wt %, a DMDES content of about 3.6 wt %, and a final aerogel with about 8.7 wt % organic content within the aerogel material. Halloysite clay, e.g., Dragonite™ was incorporated into the combined sol at about 3.0 wt % relative to silica content, which is then stirred for no less than 1 hour.

Lithium hydroxide (1.0M) was added to the combined sol at concentration sufficient to target aerogel density of about 0.0825 g/cc. The catalyzed sol containing halloysite was cast into a fiber reinforcing phase and allowed to gel. After curing for no greater than 1 h at room temperature, the aerogel materials were aged for about 10 h at 68° C. in ethanol aging fluid at an approximate fluid:gel ratio of 3:1. The aged gel was subjected to solvent extraction with supercritical $CO_2$, and then dried for 2 h at 110° C.

The fiber reinforcing phase was a homogeneous non-woven material comprised of polyester and textile grade glass fibers (E-glass composition), about 10 mm thick with a density of about 1.5 oz/sq ft. The resulting aerogel material was about 65 wt % aerogel and 35 wt % fiber, resulting in an expected material density of about 0.16-0.20 g/cc.

Example 19

An individual sol of both methyltriethoxysilane (MTES) and dimethyl diethoxysilane (DIVIDES), and one containing tetraethoxylsilane (TEOS) are independently prepared via hydrolysis under acidic conditions in ethanol. The ratio and concentration of sol materials are adjusted to obtain a hydrophobe content from MTES of about 28.8 wt %, a DMDES content of about 7.2 wt %, and a final aerogel with about 9.3 wt % organic content within the aerogel material. Halloysite clay, e.g., Dragonite™ is incorporated into the combined sol at about 3.0 wt % relative to silica content, which is then stirred for no less than 1 hour.

Guanidine hydroxide (2M) is added to the combined sol at concentration sufficient to target aerogel density of about 0.0825 g/cc. The catalyzed sol containing halloysite is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc.

Example 20

An individual sol of both methyltriethoxysilane (MTES) and dimethyl diethoxysilane (DIVIDES), and one containing tetraethoxylsilane (TEOS) are independently prepared via hydrolysis under acidic conditions in ethanol. The ratio and concentration of sol materials are adjusted to obtain a hydrophobe content from MTES of about 28.8 wt %, a DMDES content of about 7.2 wt %, and a final aerogel with about 9.3 wt % organic content within the aerogel material. Halloysite clay, e.g., Dragonite™ is incorporated into the combined sol at about 3.0 wt % relative to silica content, which is then stirred for no less than 1 hour.

Lithium hydroxide (1.0M) is added to the combined sol at concentration sufficient to target aerogel density of about 0.0825 g/cc. The catalyzed sol containing halloysite is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc.

Example 21

An individual sol of both methyltriethoxysilane (MTES) and dimethyl diethoxysilane (DIVIDES), and one containing tetraethoxylsilane (TEOS) are independently prepared via hydrolysis under acidic conditions in ethanol. The ratio and concentration of sol materials are adjusted to obtain a hydrophobe content from MTES of about 28.8 wt %, a DMDES content of about 7.2%, and a final aerogel with about 9.3 wt % organic content within the aerogel material.

Guanidine hydroxide (2M) is added to the combined sol at concentration sufficient to target aerogel density of about 0.0825 g/cc. The catalyzed sol is cast into a mold and allowed to gel. After curing for no greater than 1 h at room temperature, the aerogel monolith is aged for about 10 h at 68° C. in ethanol aging fluid at an approximate fluid:gel ratio of 3:1. The aged gel is subjected to solvent extraction with supercritical $CO_2$, and then dried for 2 h at 110° C.

The resulting aerogel monolith is uniform in density and composition, resulting in an expected material density of about 0.08-0.10 g/cc.

Example 22

An individual sol of both methyltriethoxysilane (MTES) and dimethyl diethoxysilane (DIVIDES), and one containing tetraethoxylsilane (TEOS) are independently prepared via hydrolysis under acidic conditions in ethanol. The ratio and concentration of sol materials are adjusted to obtain a hydrophobe content from MTES of about 28.8 wt %, a DMDES content of about 7.2%, and a final aerogel with about 9.3 wt % organic content within the aerogel material.

Lithium hydroxide (1.0M) is added to the combined sol at concentration sufficient to target aerogel density of about 0.0825 g/cc. The catalyzed sol is cast into a mold and allowed to gel. After curing for no greater than 1 h at room temperature, the aerogel monolith is aged for about 10 h at 68° C. in ethanol aging fluid at an approximate fluid:gel ratio of 3:1. The aged gel is subjected to solvent extraction with supercritical $CO_2$, and then dried for 2 h at 110° C.

The resulting aerogel monolith is uniform in density and composition, resulting in an expected material density of about 0.08-0.10 g/cc.

Example 23

Table 3 below illustrates exemplary ranges for ratios and concentrations of sol materials useful for producing aerogel compositions according to the methods of the preceding examples. The compositions of Table 3 are made using an individual sol of methyltriethoxysilane (MTES) or an individual sol of MTES and dimethyl diethoxysilane (DMDES) and another sol containing tetraethoxylsilane (TEOS) or polyethylsilicate that are each independently prepared via hydrolysis under acidic conditions in ethanol according to the ratios and concentrations listed in the table. Additives, e.g., meta-halloysite or meta-kaolin, are incorporated into the combined sol at a weight percentage of at least 0.5% relative to silica content, which is then stirred for no less than 1 hour.

Strong base, e.g., lithium hydroxide or guanidine hydroxide, is added to the combined sol at concentration sufficient to target silica density as listed. The catalyzed sol is cast into a fiber reinforcing phase and allowed to gel. After curing for no greater than 1 h at room temperature, the aerogel materials are aged for about 10 h at 68° C. in ethanol aging fluid at an approximate fluid:gel ratio of 3:1. The aged gel is subjected to solvent extraction with supercritical $CO_2$, and then dried for 2 h at 110° C.

The fiber reinforcing phase is a homogeneous non-woven material comprised of polyester and textile grade glass fibers (E-glass composition), about 10 mm thick with a density of about 1.5 oz/sq ft. The resulting aerogel material is about 65 wt % aerogel and 35 wt % fiber, resulting in an expected material density of about 0.16-0.20 g/cc.

TABLE 3

| MTES Content (wt %) | DMDES Content (wt %) | Organic Content (wt %) | Silica Density (g/cm3) |
|---|---|---|---|
| 38 | 0 | 8.5 | 0.0825 |
|  | 10 | 9.2 | 0.0825 |
|  | 20 | 9.9 | 0.0825 |
|  | 0 | 8.5 | 0.085 |
|  | 10 | 9.2 | 0.085 |
|  | 20 | 9.9 | 0.085 |
| 36 | 0 | 8.0 | 0.0825 |
|  | 10 | 8.7 | 0.0825 |
|  | 20 | 9.3 | 0.0825 |
|  | 0 | 8.0 | 0.085 |
|  | 10 | 8.7 | 0.085 |
|  | 20 | 9.3 | 0.085 |
| 34 | 0 | 7.6 | 0.0825 |
|  | 10 | 8.2 | 0.0825 |
|  | 20 | 8.8 | 0.0825 |
|  | 0 | 7.6 | 0.085 |
|  | 10 | 8.2 | 0.085 |
|  | 20 | 8.8 | 0.085 |

As used herein, the conjunction "and" is intended to be inclusive and the conjunction "or" is not intended to be exclusive unless otherwise indicated. For example, the phrase "or, alternatively" is intended to be exclusive.

The use of the terms "a", "an", "the", or similar referents in the context of describing the disclosure (especially in the context of the claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

As used herein, the term "about" refers to a degree of deviation typical for a particular property, composition, amount, value or parameter as identified; such as deviations based on experimental errors, measurement errors, approximation errors, calculation errors, standard deviations from a mean value, routine minor adjustments, and so forth.

Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as", "for example") provided herein, is intended merely to better illuminate the disclosure and does not pose a limitation on the scope of the disclosure unless otherwise claimed.

What is claimed:

1. A method comprising:
   providing a precursor solution comprising silica gel precursor materials and a solvent, wherein the precursor solution includes greater than 30% of at least one silica gel precursor material which is an alkylsilane having only one alkyl group attached to silicon;
   providing a basic catalyst solution wherein the basic catalyst is a catalytic amount of guanidine hydroxide, and wherein the basic catalyst allows the silica gel precursor materials to transition into a gel composition;
   combining the precursor solution and the basic catalyst solution;
   allowing the silica gel precursor materials to transition into a gel composition; and
   extracting at least a portion of the solvent from the gel composition to obtain a silica-based aerogel composition, wherein the silica-based aerogel composition is intrinsically hydrophobic without surface modification with a hydrophobizing agent.

2. The method of claim 1, wherein the alkyl group attached to silicon is a methyl group.

3. The method of claim 1, further comprising incorporating a reinforcement material into the silica-based aerogel composition.

4. The method of claim 1, further comprising incorporating an additive into the silica-based aerogel composition.

5. The method of claim 4, wherein the additive is present in a range of about 0.1 wt % to about 10 wt % of the silica-based aerogel composition.

6. The method of claim 4, wherein the additive is present in a range of about 0.5 wt % to about 3 wt %.

7. The method of claim 4, wherein the additive is selected from the group consisting of boron carbide, diatomite, manganese ferrite, manganese oxide, nickel oxide, tin oxide, silver oxide, bismuth oxide, titanium carbide, tungsten carbide, carbon black, titanium oxide, iron titanium oxide, zirconium silicate, zirconium oxide, iron oxide, iron (II) oxide, iron (III) oxide, manganese dioxide, iron titanium oxide (ilmenite), chromium oxide, silicon carbide, phyllosilicate clay, kaolin or kaolinite, metakaolin, halloysite, meta-halloysite, endellite, mica, diaspore, gibbsite, boehmite, montmorillonite, beidellite, pyrophyllite, nontronite, bravaisite, smectite, leverrierite, rectorite, celadonite, attapulgite, chloropal, volkonskoite, allophane, racewinite, dillnite, severite, miloschite, collyrite, cimolite and newtonite, sodium bicarbonate, magnesium hydroxide, magnesium dihydroxide, alumina trihydrate, gypsum, barringtonite, nesquehonite, lansfordite, hydromagnesite, dolomite, lithium carbonate or mixtures thereof.

* * * * *